US007565058B2

(12) United States Patent
Kihara et al.

(10) Patent No.: US 7,565,058 B2
(45) Date of Patent: Jul. 21, 2009

(54) FILE RECORDING APPARATUS AND EDITING METHOD FOR VIDEO EFFECT

(75) Inventors: Hiroyuki Kihara, Tokyo (JP); Satoshi Tsujii, Tokyo (JP)

(73) Assignee: Sony Corporation (JP)

( * ) Notice: Subject to any disclaimer, the term of this patent is extended or adjusted under 35 U.S.C. 154(b) by 346 days.

(21) Appl. No.: 10/572,807

(22) PCT Filed: Oct. 15, 2004

(86) PCT No.: PCT/JP2004/015287

§ 371 (c)(1),
(2), (4) Date: Apr. 2, 2007

(87) PCT Pub. No.: WO2005/041569

PCT Pub. Date: May 6, 2005

(65) Prior Publication Data

US 2007/0263979 A1    Nov. 15, 2007

(30) Foreign Application Priority Data

Oct. 28, 2003 (JP) .............................. 2003-367808

(51) Int. Cl.
*H04N 5/93* (2006.01)
(52) U.S. Cl. .......................................... 386/52; 386/53
(58) Field of Classification Search .................. 386/52, 386/53, 46, 55, 125, 124, 4
See application file for complete search history.

(56) References Cited

U.S. PATENT DOCUMENTS

2005/0018050 A1* 1/2005 Yaji et al. .............. 348/207.99
2005/0132406 A1* 6/2005 Nesterov ..................... 725/74

FOREIGN PATENT DOCUMENTS

JP    2001-028750    1/2001
JP    2002-216460    8/2002

OTHER PUBLICATIONS

International Search Report dated Feb. 8, 2005.

* cited by examiner

*Primary Examiner*—Robert Chevalier
(74) *Attorney, Agent, or Firm*—Rader Fishman & Grauer PLLC; Ronald P. Kananen

(57) ABSTRACT

The present invention is directed to a video Effect editing method of automatically preparing/editing Movie Atom having Effect track by an instruction such that user pushes down a button for a time period during which he desires to implement Effect during Movie recording and/or reproducing, etc., the video Effect editing method comprises: accepting an input by user to prepare plural management information different in reproduction purpose such as original Movie and Movie to which Effect has been implemented to the Movie at the time of recording video data in performing edit function of preparation and deletion of Effect track, and preparation, processing and deletion of Effect track period within the Effect track.

18 Claims, 26 Drawing Sheets

| EFFECT PERIOD TABLE | | | |
|---|---|---|---|
| EFFECT KIND | EFFECT PARAMETER | START TIME | DURATION |
| Effect_1 | Param_1 | 00:01:00 | 00:01:00 |
| Effect_2 | Param_2 | 00:03:00 | 00:01:00 |

|  | START TIME | DURATION |
|---|---|---|
| Effect_1 | 00:01:00 | 00:03:00 |
| Effect RELEASE | 00:02:00 | 00:01:00 |
| Effect_2 | 00:02:00 | 00:01:00 |

FIG.8B

|  | START TIME | DURATION |
|---|---|---|
| Effect_1 | 00:01:00 | 00:01:00 |
| Effect_1 | 00:03:00 | 00:01:00 |
| Effect_2 | 00:02:00 | 00:01:00 |

FIG.8C

|  | START TIME | DURATION |
|---|---|---|
| Effect_1 | 00:01:00 | 00:02:00 |
| Effect_2 | 00:02:00 | 00:01:00 |

FIG.8D

TABLE 1

|  | START TIME | DURATION |
|---|---|---|
| Effect_1 | 00:01:00 | 00:02:00 |

TABLE 2

|  | START TIME | DURATION |
|---|---|---|
| Effect_2 | 00:02:00 | 00:01:00 |

| EFFECT KIND | EFFECT PARAMETER | START TIME | DURATION |
|---|---|---|---|
| Effect_1 | Param_1 | 00:01:00 | ..... |

| EFFECT KIND | EFFECT PARAMETER | START TIME | DURATION |
|---|---|---|---|
| Effect_1 | Param_1 | 00:01:00 | 00:01:00 |

| EFFECT KIND | EFFECT PARAMETER | START TIME | DURATION |
|---|---|---|---|
| Effect RELEASE | | 00:01:00 | ..... |
| Effect_1 | Param_1 | 00:01:00 | ..... |

| EFFECT KIND | EFFECT PARAMETER | START TIME | DURATION |
|---|---|---|---|
| Effect RELEASE | | 00:01:00 | 00:01:00 |
| Effect_1 | Param_1 | 00:01:00 | 00:01:00 |

MARK TABLE

| TIME |
|---|
| 00:00:00 |
| 00:01:00 |
| 00:02:00 |
| 00:03:00 |

| EFFECT KIND | EFFECT PARAMETER | START TIME | DURATION |
|---|---|---|---|
| Effect_1 | Param_1 | 00:01:00 | 00:03:00 |

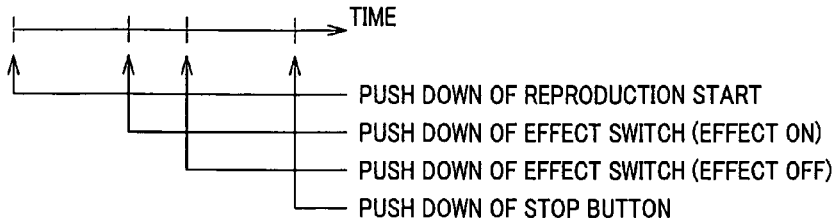

FIG.24A
- PUSH DOWN OF REPRODUCTION START
- PUSH DOWN OF EFFECT SWITCH (EFFECT ON)
- PUSH DOWN OF EFFECT SWITCH (EFFECT OFF)
- PUSH DOWN OF STOP BUTTON

FIG.24B

| EFFECT KIND | EFFECT PARAMETER | START TIME | DURATION |
|---|---|---|---|
| Effect_1 | Param_1 | 00:01:00 | 00:03:00 |

FIG.24C

| EFFECT KIND | EFFECT PARAMETER | START TIME | DURATION |
|---|---|---|---|
| Effect_1 | Param_1 | 00:01:00 | 00:03:00 |
| Effect_2 | Param_2 | 00:02:00 | 00:01:00 |

ENTRY ADDED DURING REPRODUCTION

FIG.24D

| EFFECT KIND | EFFECT PARAMETER | START TIME | DURATION |
|---|---|---|---|
| Effect_1 | Param_1 | 00:01:00 | 00:03:00 |

ENTRY EXISTING FROM BEGINNING

| EFFECT KIND | EFFECT PARAMETER | START TIME | DURATION |
|---|---|---|---|
| Effect_2 | Param_2 | 00:02:00 | 00:01:00 |

ENTRY ADDED DURING REPRODUCTION

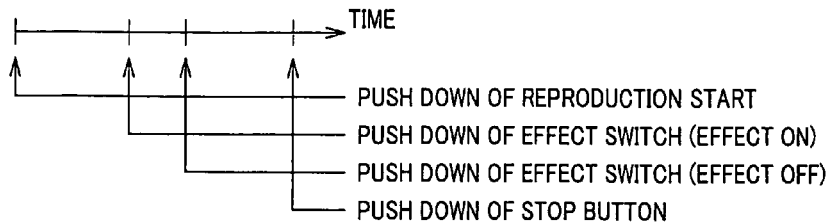

- PUSH DOWN OF REPRODUCTION START
- PUSH DOWN OF EFFECT SWITCH (EFFECT ON)
- PUSH DOWN OF EFFECT SWITCH (EFFECT OFF)
- PUSH DOWN OF STOP BUTTON

FIG.26A

| EFFECT KIND | EFFECT PARAMETER | START TIME | DURATION |
|---|---|---|---|
| Effect_1 | Param_1 | 00:01:00 | 00:03:00 |

FIG.26B

| EFFECT KIND | EFFECT PARAMETER | START TIME | DURATION | |
|---|---|---|---|---|
| Effect_1 | Param_1 | 00:01:00 | 00:02:00 | |
| Effect解除 | | 00:03:00 | 00:04:00 | ENTRY ADDED DURING REPRODUCTION |
| Effect_2 | Param_2 | 00:02:00 | 00:03:00 | |

FIG.26C

| EFFECT KIND | EFFECT PARAMETER | START TIME | DURATION | |
|---|---|---|---|---|
| Effect_1 | Param_1 | 00:01:00 | 00:02:00 | ← DIVIDED ENTRY |
| Effect_1 | Param_1 | 00:03:00 | 00:04:00 | ← DIVIDED ENTRY |
| Effect_2 | Param_2 | 00:02:00 | 00:03:00 | ← ENTRY ADDED DURING REPRODUCTION |

| EFFECT KIND | EFFECT PARAMETER | START TIME | DURATION |
|---|---|---|---|
| Effect_1 | Param_1 | 00:01:00 | 00:01:00 |
| Effect_2 | Param_2 | 00:03:00 | 00:01:00 |

FILE RECORDING APPARATUS AND EDITING METHOD FOR VIDEO EFFECT

TECHNICAL FIELD

The present invention relates to a file recording apparatus applied to video camera for recording image pick-up result by file of QT format, etc., and further relates to an editing method for video Effect.

This Application claims priority of Japanese Patent Application No. 2003-367808, filed on Oct. 28, 2003, the entirety of which is incorporated by reference herein.

BACKGROUND ART

Hitherto, as file format complying with multimedia, Quick Time file format (hereinafter refereed to as QT format) is widely known. In recent years, there have been standardized ISO Base Media file format based on the QT format (MPEG4-part 12), MPEG4(MP4) MPEG-part14 which is application file thereof, Motion JPEG2000(MJ2) file format, and/or AVC (Advanced Video Coding: MPEG4-part 15) file format, etc.

In the QT format, real data by moving picture, still picture and/or sound, etc. are collected into block, and management information for performing management of the real data are collected into block in a manner different from the block of the real data. Hereinafter, such block will be called Atom. The Atom in which real data are collected is referred to as Movie Data Atom. Moreover, the Atom in which management information are collected is referred to as Movie Atom.

Here, in the Movie Atom, management information are collected every attribute so that box is provided. Thus, various Atoms are formed by the hierarchical structure. In the Movie Atom, there are prepared various tracks, etc. by block of management information corresponding to the kind of real data by Atoms based on the hierarchical structure. In concrete terms, in the Movie Atom, in the case where media data are video and data sound data, video tracks and audio tracks are respectively formed. As a result, management of corresponding real data of Movie Data Atom are respectively performed by respective tracks. Thus, while not only video data by moving picture but also image data by still picture are assigned to the video tracks, tracks to which management information of data in which video data and audio data are multiplexed, e.g., MPEG2-PS (program Stream) data, etc. are assigned are not classified into video tracks, and are called base Media track. Even in the case where kind is different as stated above, when video data are assigned, real data by both tracks is caused to be subject to editing. In the following description, video tracks are used in a sense also including base Media track for performing management of real data including video data as occasion demands. Moreover, in the case where corresponding track is positively mentioned as video track, this track means track to which management information of video data are assigned, except for sound track.

In the management of such real data, management may be performed not only with respect to Movie Data Atom integrally held, but also with respect to Movie Data Atom held at other file, thus making it possible to provide various media by the so-called internal reference form and the external reference form.

On the contrary, in the Movie Data Atom, real data is divided by Sample serving as a predetermined minimum management unit. In the QT format, management information are respectively set to Movie Atom with respect to the minimum management unit of real data. Thus, in the case where file is prepared by the QT format, one frame corresponding to unit of display or 1GOP (Group Of Pictures) is ordinarily set to one Sample by taking into consideration convenience of processing.

In the editing processing of adding Effect of video data in the QT format, video data actually prepared into Effect processed real data is assigned to Movie Data Atom, and Movie Atom is formed by video track corresponding to the above-mentioned video data to have ability to prepare file by editing result.

Moreover, the QT format may be also caused to be of the configuration in which Movie Data Atom by original video data is used in place of Movie Data Atom by video data which has been caused to undergo such actually Effect implemented editing processing to also have ability to perform edit processing of adding Effect to video data at the time of reproduction. In such video data editing operation, Effect track to which management information according to edit processing is assigned is formed at Movie Atom so that Movie Data Atom according to the original video data is assigned to input source of the Effect track.

Meanwhile, in the case where Movie to which Effect has been implemented at the time of recording is recorded at an apparatus capable of performing recording and/or reproducing image and/or sound by using file format in which video Effect function is implemented and the QT format is used as base, it is impossible to nullify that Effect to return corresponding Movie to the original Movie, or to alternate into different Effect.

In addition, since display unit mounted in mobile equipment is small, information quantity which can be displayed is limited. For this reason, it is difficult to prepare such an edit picture to display plural successive frames in implementing Effect to Movie to set Effect period.

DISCLOSURE OF THE INVENTION

Problems to be Solved by the Invention

An object of the present invention is to provide a novel file recording apparatus and a novel editing method for video effect which can solve problems that prior arts have.

Another object of the present invention is to have ability to prepare plural Movie Atoms different in reproduction purpose such as original Movie and Movie to which Effect has been implemented to the Movie, etc. at the time of recording Movie at an apparatus capable of recording and/or reproducing image and/or sound by using file format in which video Effect function has been implemented and the QT format is used as base.

A further object of the present invention is to permit Movie Atom having Effect track to be automatically prepared and edited by an instruction such that user pushes down a button at a time period during which he desires to implement Effect during Movie recording and/or Movie reproduction.

The present invention is directed to a file recording/reproducing apparatus adapted for performing recording/reproduction of video data, through a recording medium, as a file in which management information for performing management of real data are collected by hierarchical structure, the file including block of management information at least including video tracks by management information of video data and Effect tracks by management information of Effects to be set at the video data, and block at least including real data according to the Effect tracks, the file recording/reproducing apparatus comprising: a recording/reproducing unit for recording/reproducing, through the recording medium, data of boxes of the real data and the management information; a data processing unit for sequentially setting management unit at the real data to sequentially acquire the management information in correspondence with recording/reproduction of the real data to hold the management information thus acquired in a memory to output, to the recording/reproducing unit, the data of the box of the management information held in the memory by responding to completion of recording of the real data; and a control unit for accepting an input by user to prepare plural management information different in reproduction purpose such as original Movie and Movie to which Effect has been implemented to the Movie at the time of recording video data in performing edit function of preparation and/or deletion of Effect track, and preparation, processing and deletion of Effect track period within the Effect track.

Moreover, the present invention is directed to an editing method for video Effect at a file recording/reproducing apparatus adapted for performing recording/reproduction of video data, through a recording medium, as a file in which management information for performing management of real data are collected by hierarchical structure, the file including block of management information at least including video tracks by management information of video data and Effect tracks by management information of Effects to be set at video data, and block of real data at least including real data according to the Effect tracks, the editing method comprising: accepting an input by user to prepare plural management information different in reproduction purpose such as original Movie and Movie to which Effect has been implemented to the Movie at the time of recording video data in performing edit function of preparation and/or deletion of Effect track, and preparation, processing and deletion of Effect track period within the Effect track.

In the present invention, immediately after recording of video data, not only original Movie, but also Movie to which Effect edit processing has been implemented to the Movie are prepared at the same time.

Moreover, in the present invention, only by an instruction such that user selects desired Effect kind/parameter during recording or reproduction of video data to push down a button at a time period during which he desires to implement Effect, etc., it is possible to easily prepare Movie to which Effect has been implemented.

Further, in the present invention, in the Effect editing work, there is employed an approach to select a desired Effect at the time of recording or reproducing video data to perform ON/OFF of Effect at an arbitrary portion to thereby realize editing work. For this reason, a display unit having high resolution is not required. When such an operation is performed for an Effect time period during which Effect has been already implemented, it is possible to alternate Effect, or to easily prepare Movie of multiple Effect.

In addition, in the present invention, after Effect has been implemented to a portion or the entirety of Movie, it is possible to easily return to the original state where Effect is not implemented.

Still further objects of the present invention and practical merits obtained by the present invention will become more apparent from the description which will be given below with reference to the attached drawings.

Figure 4:
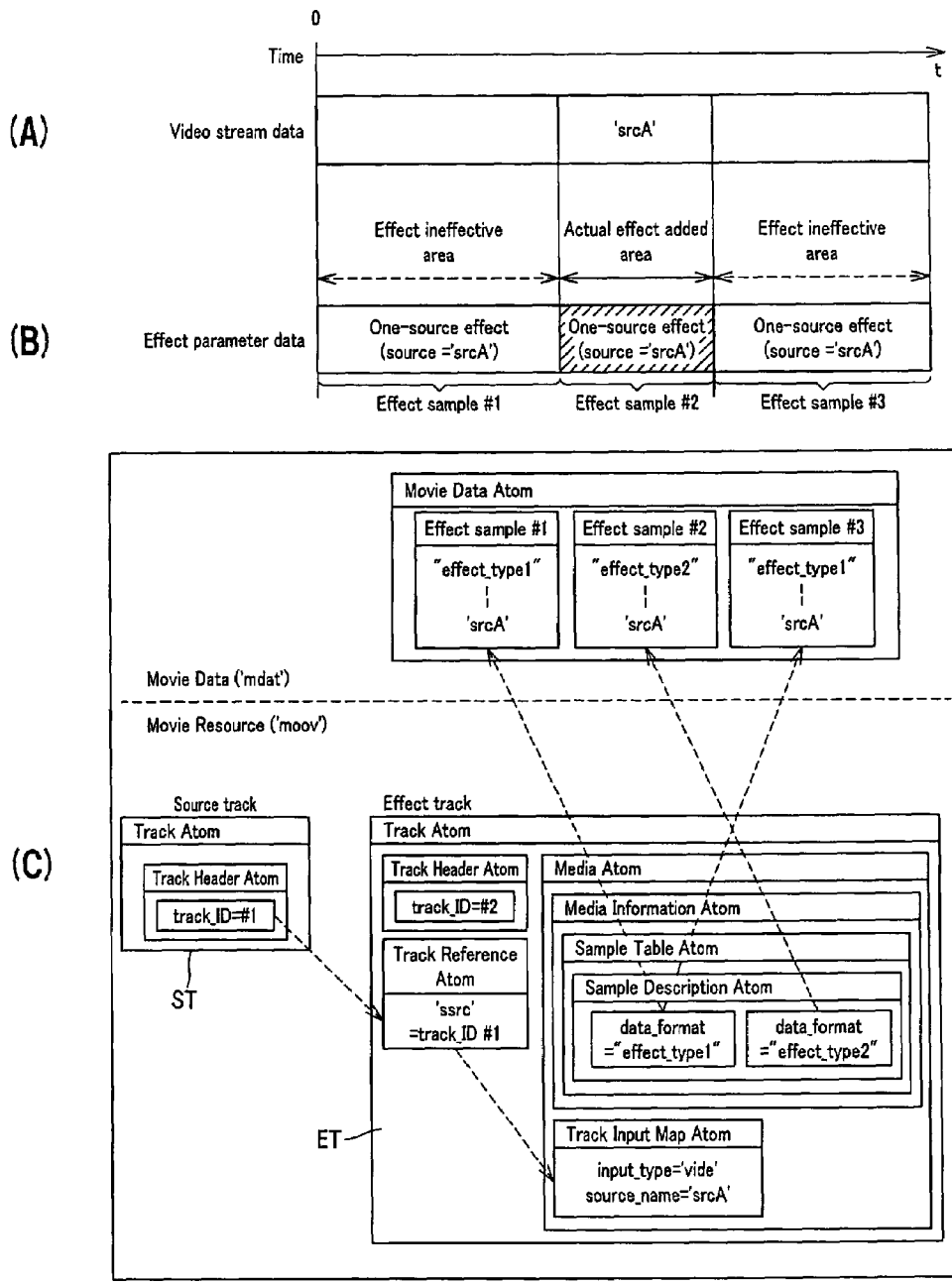

(A) to (C) of FIG. 4 are views showing the first half portion in which Atom structure called One-source Effect in QT is described as a list in a manner of C language.

Figure 5:
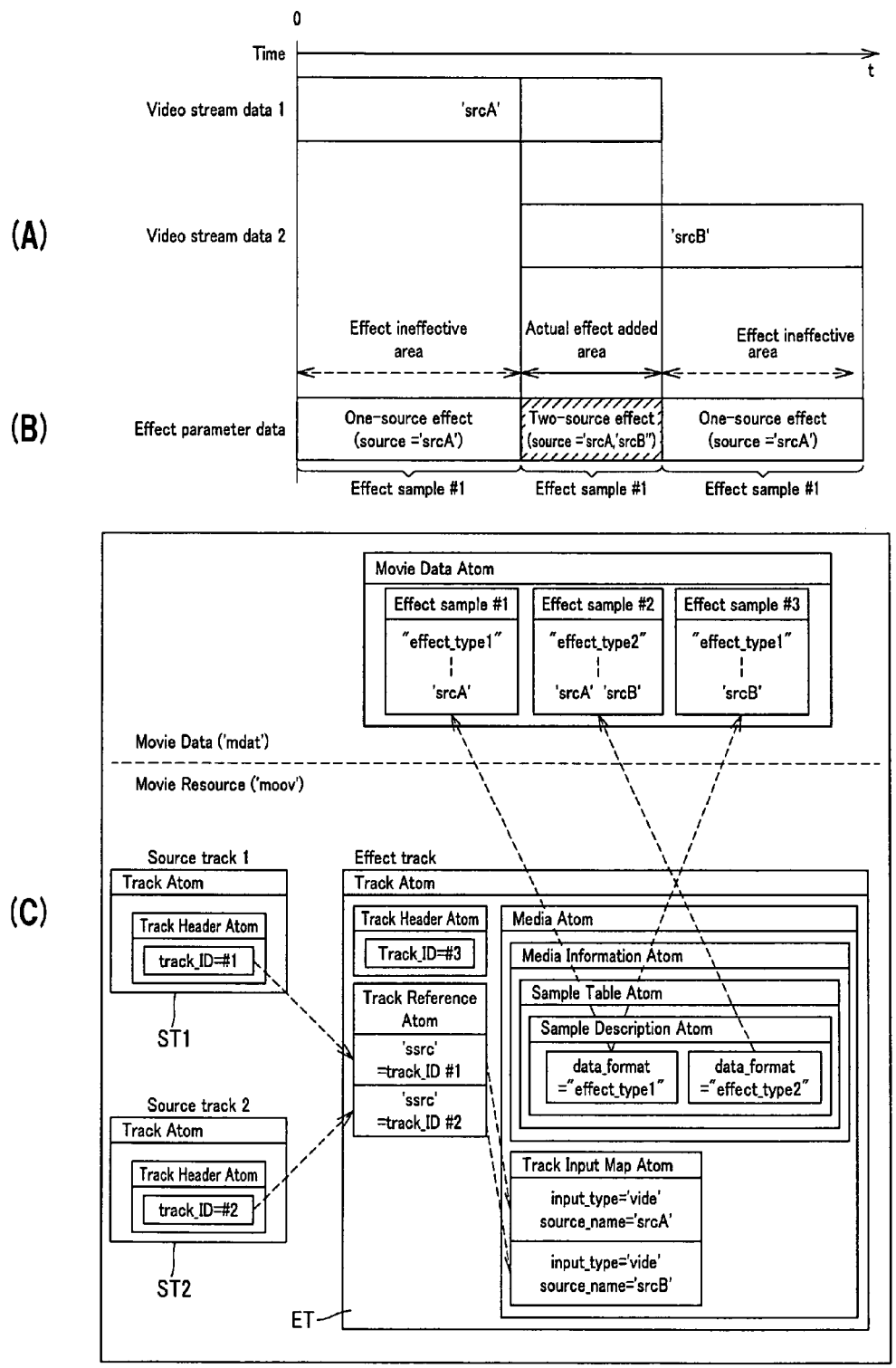

(A) to (C) of FIG. 5 are views showing, as a realization example of Two-source Effect, track configuration in Movie file, outline of Movie Atom structure, and outline of Movie Data Atom structure.

Figure 6:
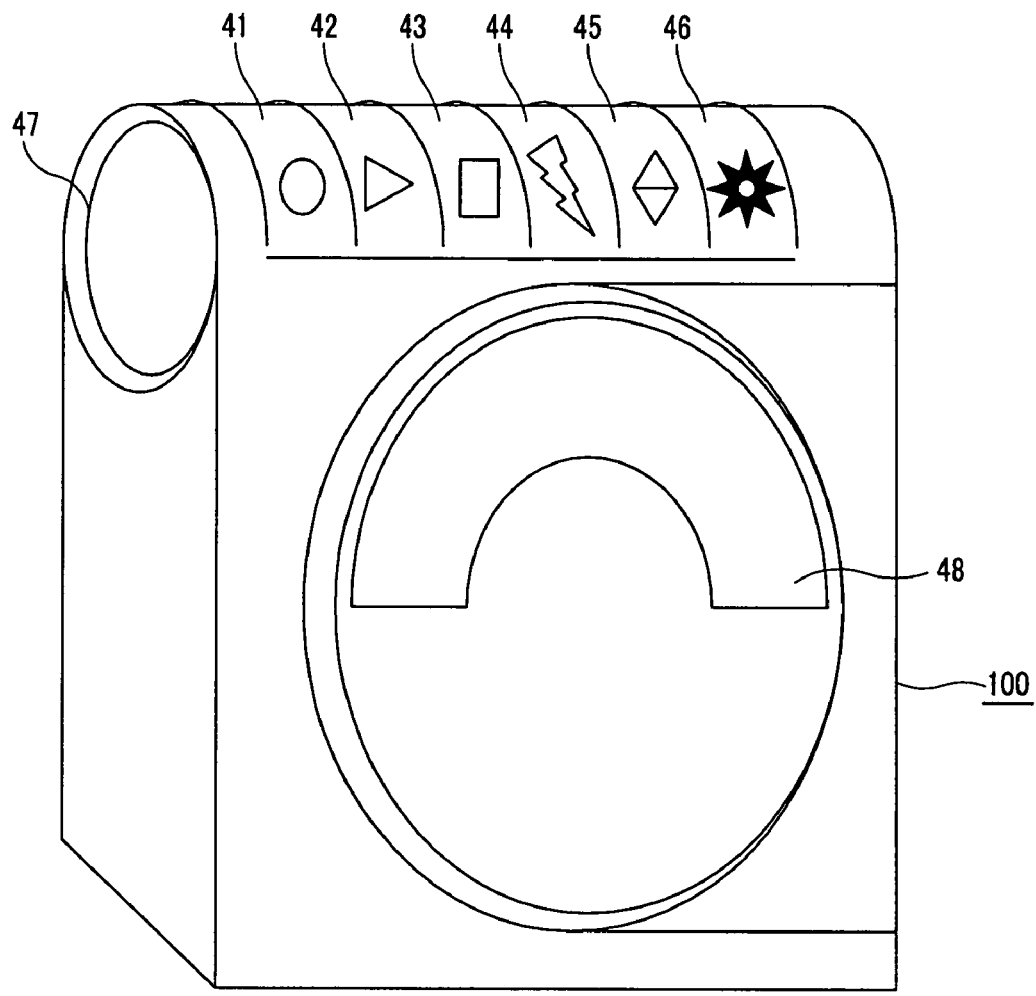

FIG. 6 is an outer appearance perspective view showing a video disk camera in which video disk device is mounted.

FIG. 7 is a view showing Effect period Table.

FIGS. 8A to 8D are views for explaining processing which performs arrangement of Effect period Table, wherein FIG. 8A shows original Effect period Table, FIG. 8B shows Effect period Table after arrangement of the period Table of FIG. 8A is performed, FIG. 8C shows original Effect period Table, and FIG. 8D shows Effect period Tables 1, 2 after arrangement of the Effect period Table shown in FIG. 8C is performed.

FIGS. 9A to 9D are views showing the states of Effect period entry corresponding to processing for performing arrangement of Effect period Table.

Figures 10, 11:
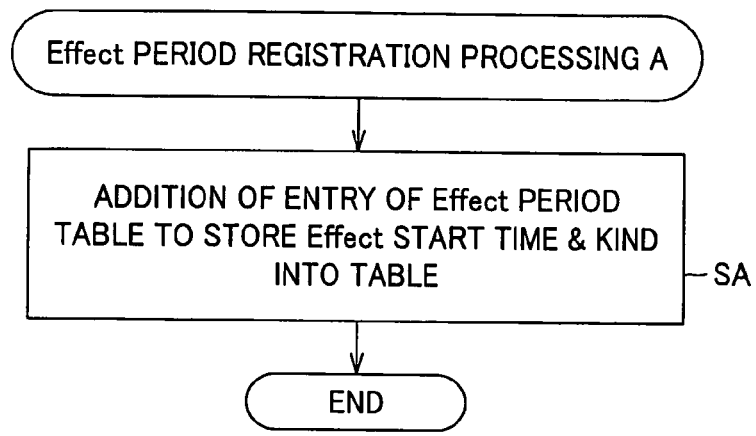

FIG. 10 is a flowchart showing Effect period registration processing A of the multiple Effect type.

FIG. 11 is a view showing an example of the state of Effect period Table immediately after processing of the Effect period registration processing A of the multiple Effect type.

Figures 12, 13:
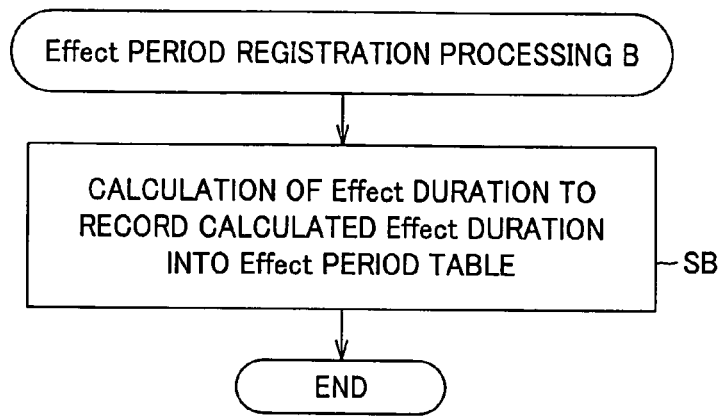

FIG. 12 is a flowchart showing Effect period registration processing B of the multiple Effect type.

FIG. 13 is a view showing an example of the state of the Effect period Table immediately after the processing of the Effect period registration processing B of the multiple Effect type.

Figures 14, 15:
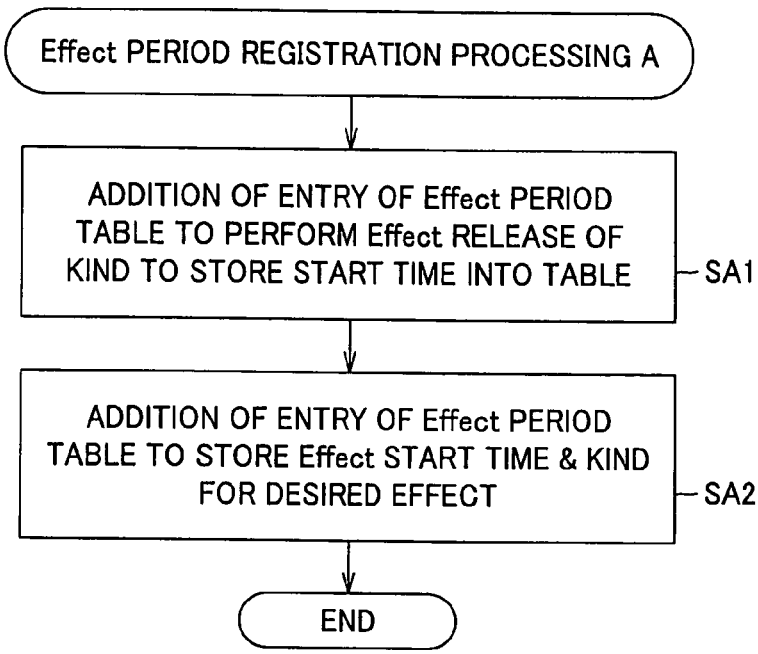

FIG. 14 is a flowchart showing the Effect period registration processing A of the overwrite type.

FIG. 15 is a view showing an example of the state of Effect period Table immediately after processing of the Effect period registration processing A of the overwrite type.

Figures 16, 17:
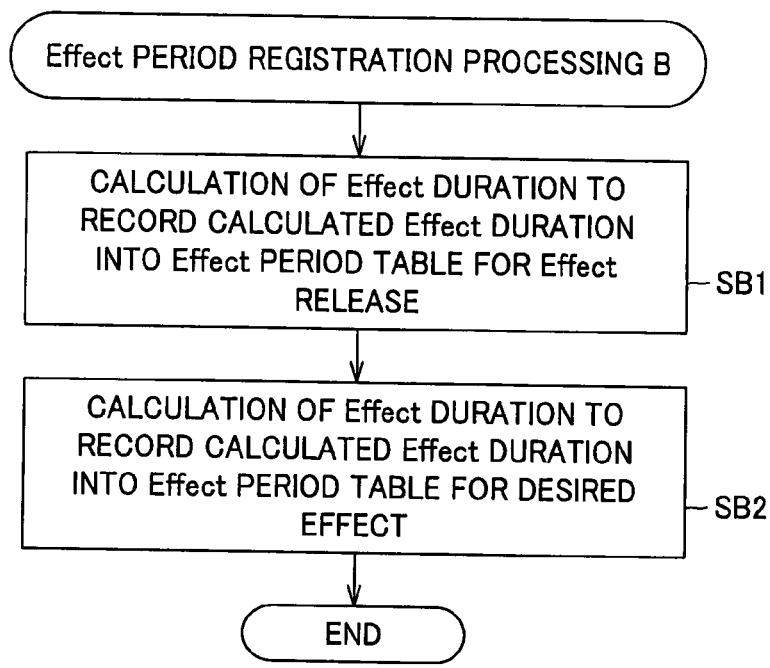

FIG. 16 is a flowchart showing Effect period registration processing B of the overwrite type.

FIG. 17 is a view showing an example of the state of Effect period Table immediately after the processing of Effect period registration processing B of the overwrite type.

FIG. 18 is a view showing mark Table.

Figure 19:
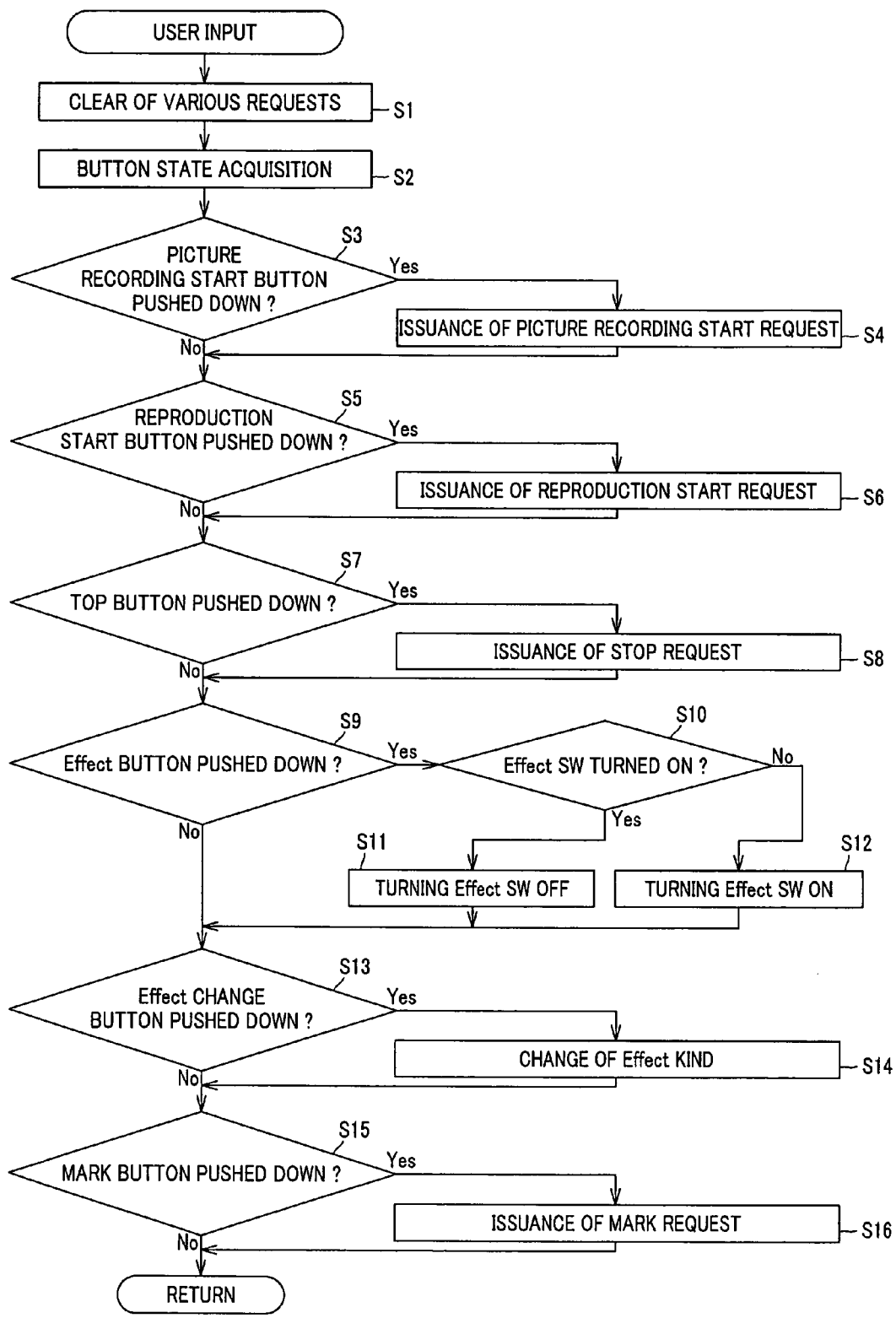

FIG. 19 is a flowchart showing procedure of processing executed by user input part.

Figure 20:
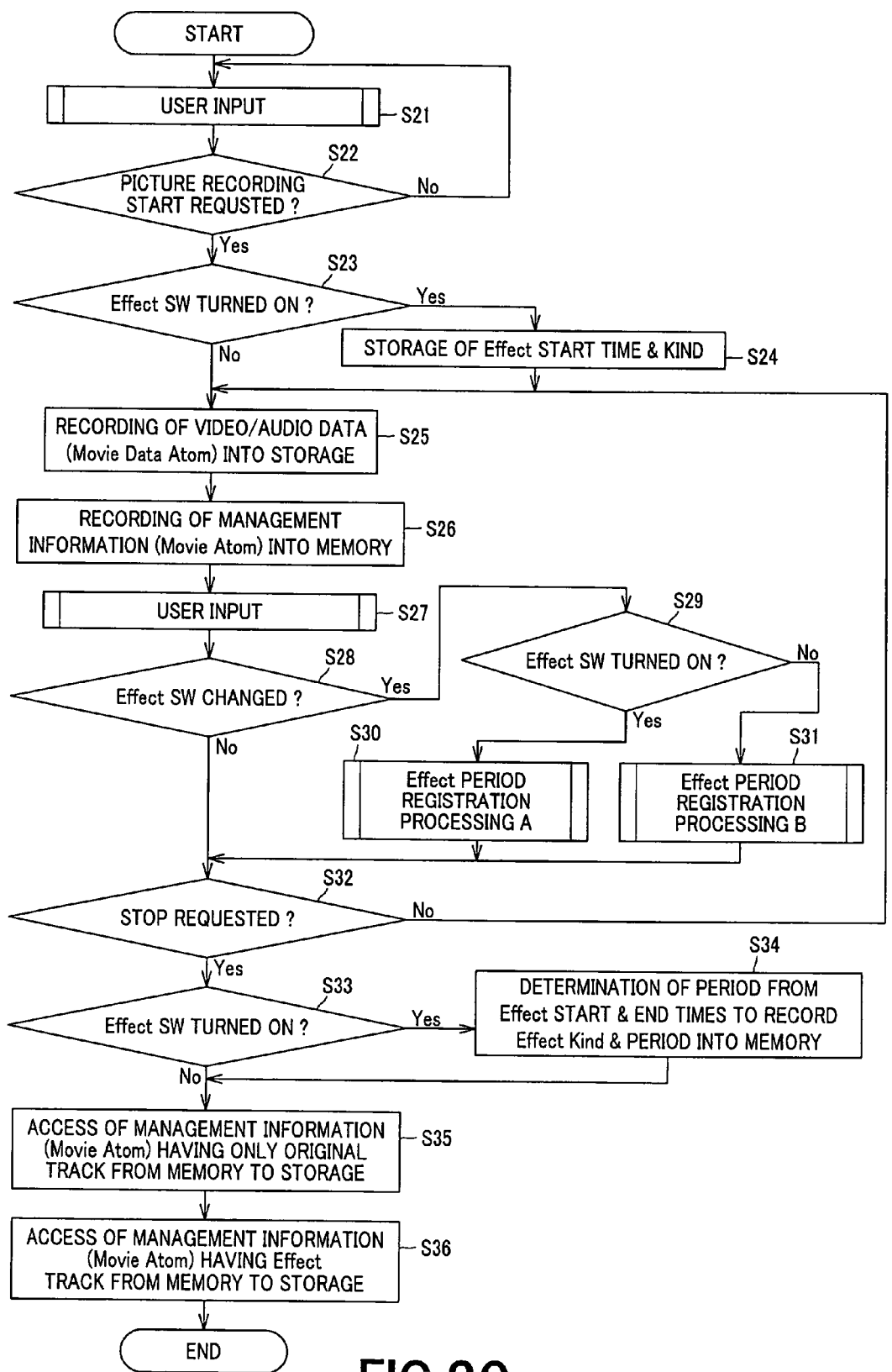

FIG. 20 is a flowchart showing procedure of processing executed by main part in the case where Effect is designated by instruction from user at the time of record photographing.

Figure 21:
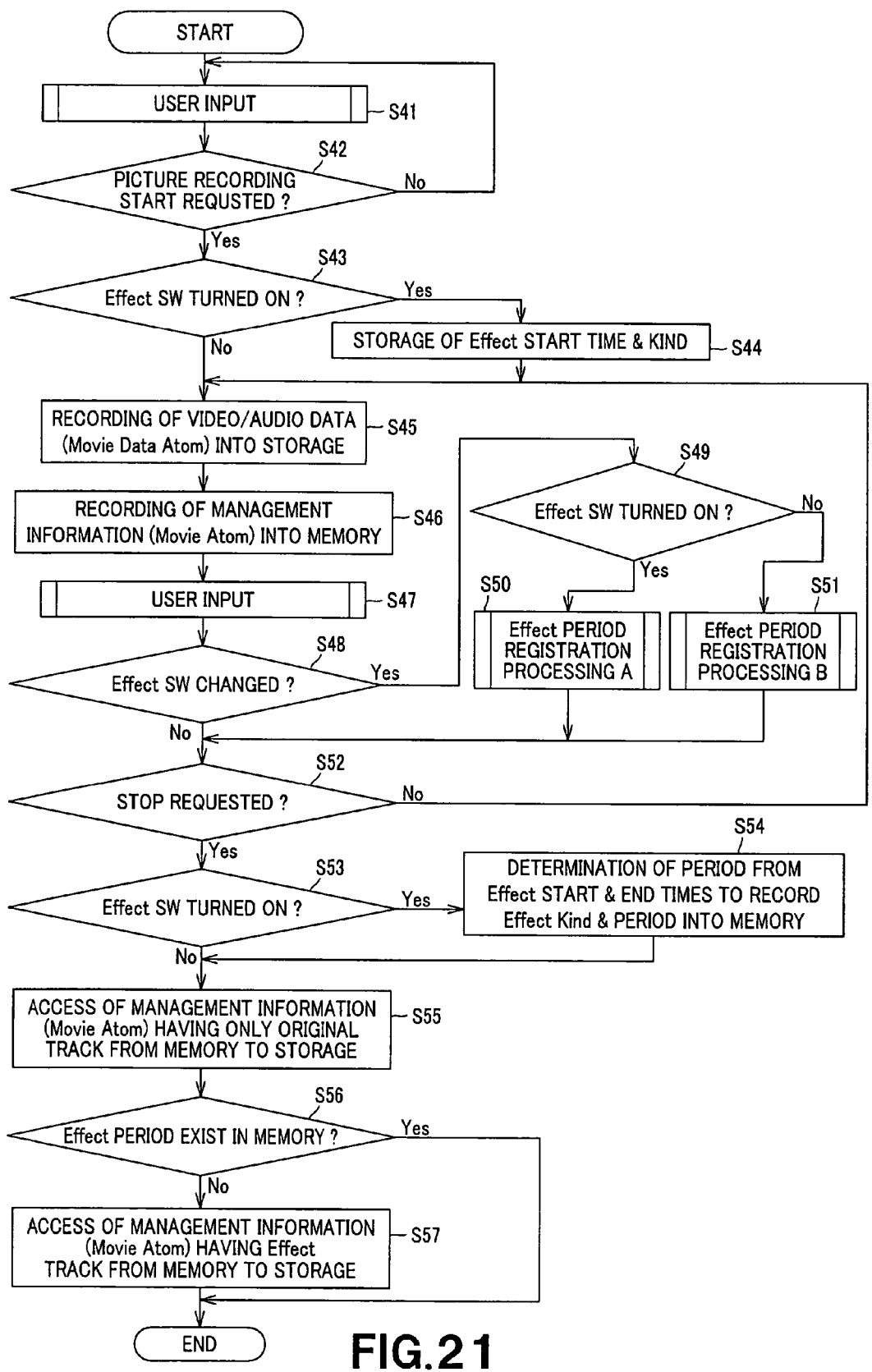

FIG. 21 is a flowchart showing procedure of processing executed by main part in the case where Effect is designated by instruction from user at the time of record photographing.

FIGS. 22A to 22E are views showing a practical example of processing executed by main part.

Figure 23:
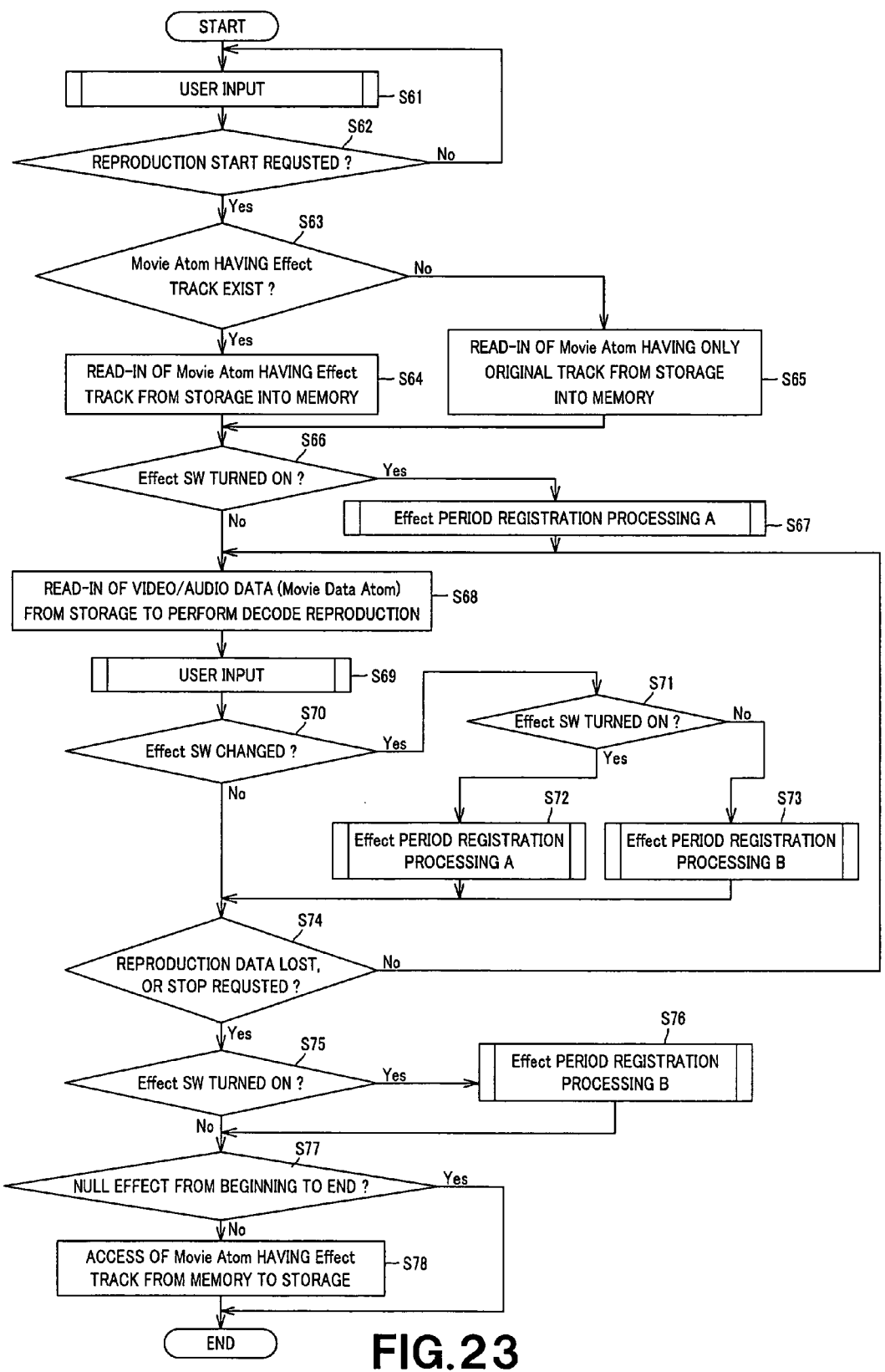

FIG. 23 is a flowchart showing procedure of reproduction processing executed by the main part at the time of reproduction.

FIGS. 24A to 24D are views showing a practical example of reproduction processing executed by the main part.

Figure 25A:
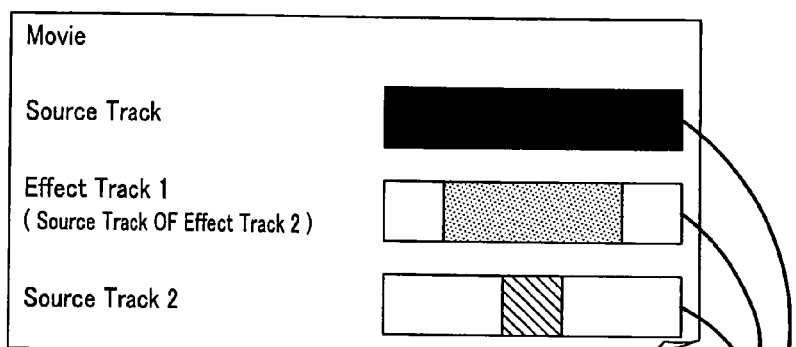
Figure 25B:
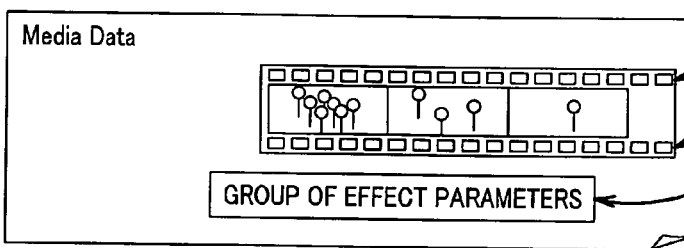

FIGS. 25A and 25B are views showing a practical example of reproduction processing executed by the main part.

FIGS. 26A to 26D are views showing a practical example of reproduction processing executed by the main part.

Figure 27A:
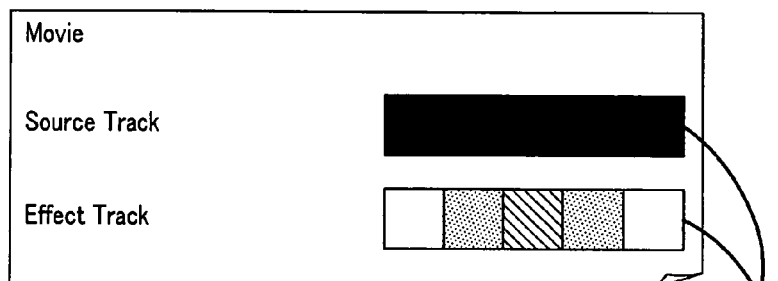
Figure 27B:
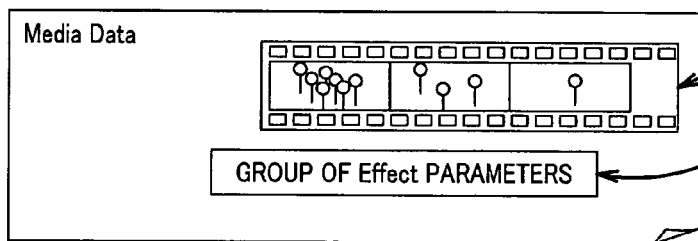

FIGS. 27A and 27B are views showing a practical example of reproduction processing executed by the main part.

Figure 28:
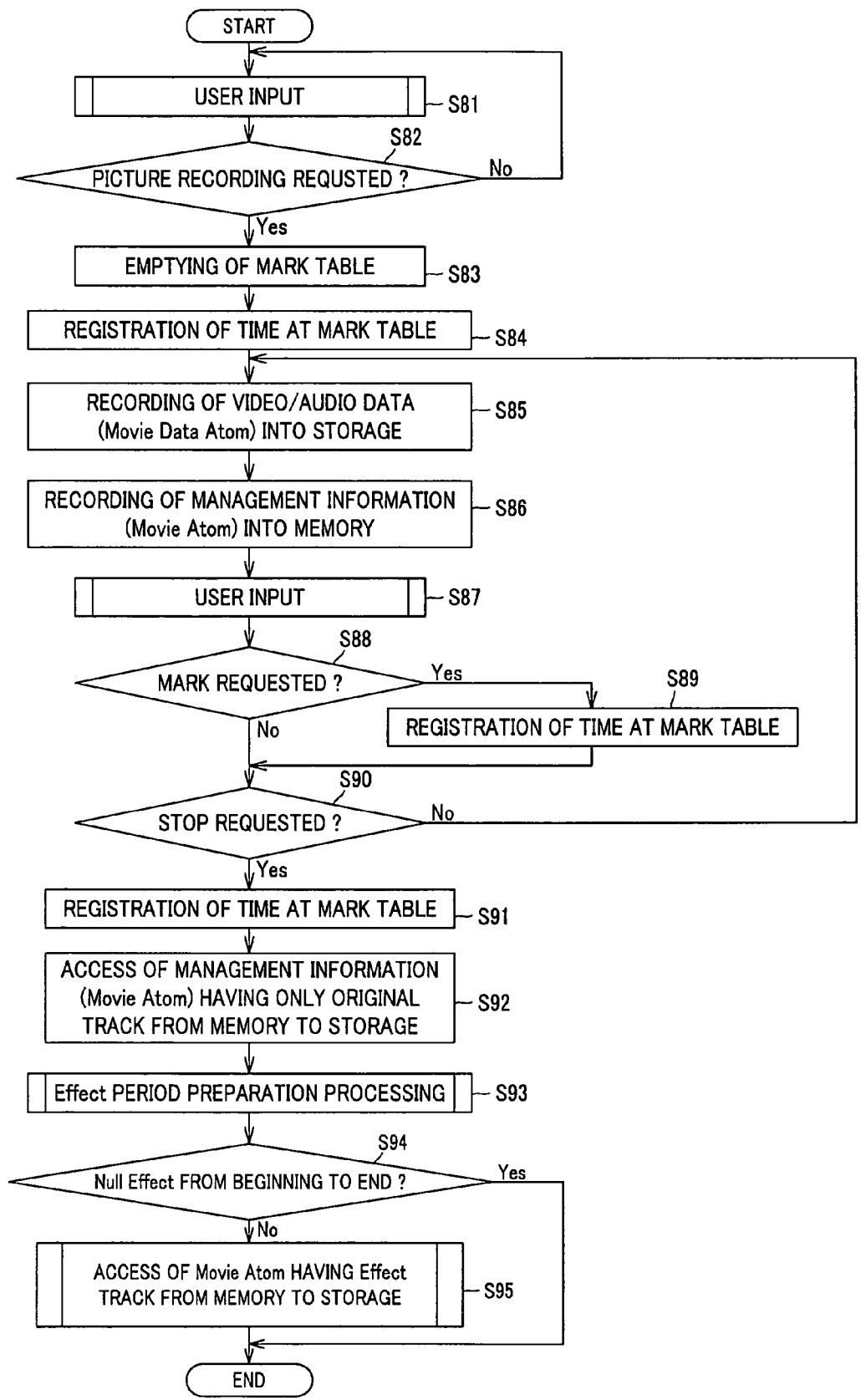

FIG. 28 is a flowchart showing the processing of processing executed by the main part in the case where mark is attached on the time axis by instruction from user.

FIGS. 29A to 29D are views showing a practical example of processing for preparing Effect period.

Figure 30A:
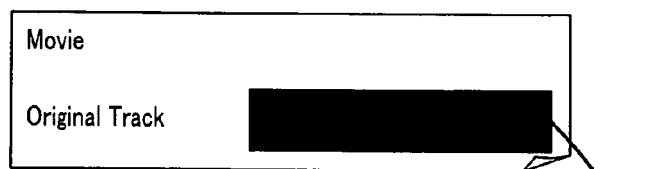
Figure 30B:
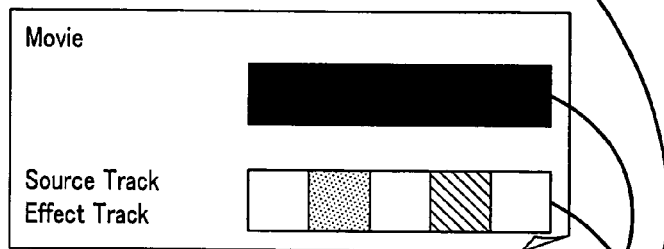
Figure 30C:
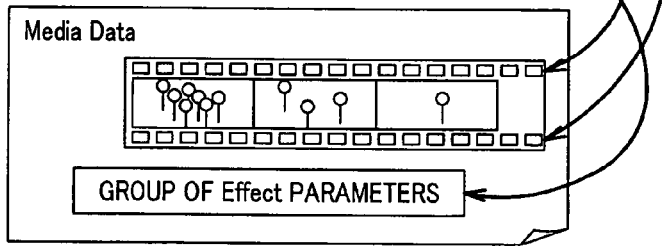

FIGS. 30A to 30C are views showing a practical example of processing for preparing Effect period.

BEST MODE FOR CARRYING OUT THE INVENTION

Embodiments of the present invention will now be explained in detail with reference to the attached drawings.

In the embodiments which will be described below, explanation will be given in connection with a file preparation method by software or hardware for preparing multimedia file such as image and/or sound, etc., having file structure of the form divided into real data storage part and management information storage part such as QT (Quick Time) format, ISO Base Media file format based on the QT format (MPEG4-part 12), MPEG4 (MP4) MPEG4-part 14 which is application format thereof, Motion JPEG2000(MJ2) and/or AVC (Advanced Video Coding: MPEG4-part 15).

The present invention is applied to a video disk camera in which, e.g., optical disk is used as recording medium to record signals compressed by MPEG in accordance with file format of the QT base.

Figure 1:
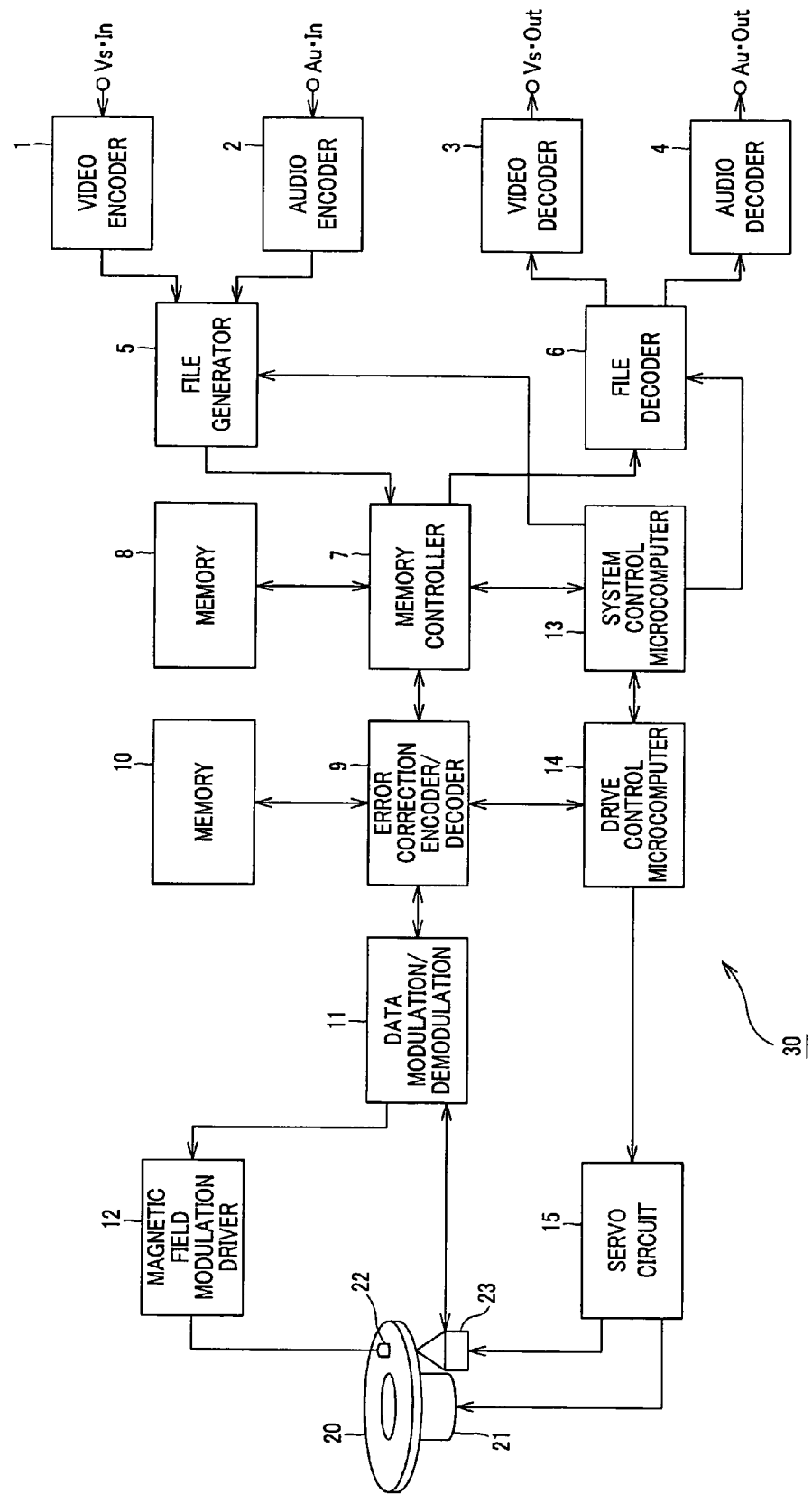
FIG. 1 is a block diagram showing a video disk device used as a recording/reproducing unit for video disk camera to which the present invention is applied.

FIG. 1 is a block diagram showing a video disk device 30 to which the present invention is applied. The video disk device 30 is used as a recording/reproducing unit of the video disk camera.

The video disk device 30 shown in FIG. 1 serves to acquire a video signal and an audio signal of an object by image pick-up unit and sound acquisition unit which are not shown to record, onto an optical disc 20, image pick-up result based on the video signal and the audio signal to reproduce the image pick-up result which has been recorded on the optical disc 20 to display the image pick-up result thus reproduced on a display unit using liquid crystal display panel and to provide an output by a sound output unit comprised of speaker, and to output them to external equipment or equipments. The video disk device 30 comprises a spindle motor 21 for rotationally driving the optical disk 20, and a magnetic head 22 and an optical head 23 which are adapted for performing recording/reproduction of data through the optical disk 20.

The video disk device 30 comprises a video encoder 1 supplied with a video signal Vs of an object which has been acquired by image pick-up means (not shown), an audio encoder 2 supplied with an audio signal Au which has been acquired by sound acquisition unit (not shown), a video decoder 3 for outputting a video signal Vs to display means comprised of liquid crystal display panel (not shown), an audio decoder 4 for outputting an audio signal Au to the audio output unit comprised of speaker (not shown), a file generator 5 connected to the video encoder 1 and the audio encoder 2, a file decoder 6 connected to the video decoder 3 and the audio decoder 4, a memory controller 7 connected to the file generator 5 and the file decoder 6, a memory 8 and an error correction encoder/decoder 9 which are connected to the memory controller 7, a memory 10 and a data modulator/demodulator 11 which are connected to the error correction encoder/decoder 9, and a magnetic field modulation driver 12 connected to the data modulator/demodulator 11, wherein a magnetic head 22 is connected to the magnetic field modulation driver 12, and an optical head 23 is connected to the data modulator/demodulator 11.

Further, the video disk device 30 comprises a microcomputer for system control (hereinafter referred to as system control microcomputer) 13, a microcomputer for drive control (hereinafter referred to as drive control microcomputer) 14, and a servo circuit 15.

When moving picture is recorded at the video disk device 30, a video signal is inputted to the video encoder 1, at which it is encoded, and an audio signal is inputted to the audio encoder 2, at which it is encoded, first of all. The video signal and the audio signal which have been encoded are respectively converted into data sequences of digital signals. In this example, at the video encoder 1 and the audio encoder 2, e.g., video compression and audio compression by MPEG are performed.

Namely, the video encoder 1 performs analog/digital conversion processing of video signal obtained as image pick-up result to generate video data to perform encode processing of the video data in accordance with the format of MPEG to output elementary stream consisting of video data. Moreover, the audio encoder 2 performs analog/digital conversion processing of audio signal obtained as image pick-up result to generate audio data to perform encode processing of the audio data in accordance with the format of MPEG to output elementary stream consisting of audio data.

Then, the video data and the audio data which have been compressed are synchronized at the time of encoding video data and audio data, and are then multiplexed by the file generator 5. Moreover, in the file generator 5, there are included software and hardware for assembling, in a memory mounted therein, part in which there is stored information for performing management of real data to be multiplexed, which is called Movie Atom (type name: 'moov') for the purpose of generating file form in conformity with QT format which will be described later. Since this Movie Atom is not recorded onto disk as occasion demands during one record photographing operation, but is completed for the first time when record photographing operation is completed, it is assembled (stored) into the mounted memory as occasion demands so that it is finally recorded onto the disk at the time point when record photographing operation has been completed. In addition, in the QT format which will be described later, real data to be multiplexed are stored into a part called media data Atom (type name: 'mdat'), and are recorded onto disk after experiencing the processing described as below as occasion demands, during recording, unlike the Movie Atom.

Further, multiplexed data are sequentially written into the memory 8 through the memory controller 7. The memory controller 7 serves to read out, from the memory 8, in accordance with write request of data onto disk inputted by the system control microcomputer 13, the video data and the audio data which have been multiplexed to output them to the error correction encoder/decoder 9. Here, in the case where transfer rate of data in which video data and audio data are multiplexed is lower than transfer rate of data write operation onto the disk, the multiplexed data are substantially continuously written into the memory 8 in ordinary state, whereas read-out operation from the memory 8 is intermittently performed while the system control microcomputer 13 monitors that the memory 8 does not overflow and underflow.

Namely, the file generator 5 serves, at the time of recording, to synchronize and multiplex respective elementary streams of video data and audio data which are outputted from the video encoder 1 and the audio encoder 2 to prepare QT file by control of the system control microcomputer 13. For this reason, the file generator 5 serves to multiplex respective elementary streams of video data and audio data which are sequentially inputted to perform write-once operation of data necessary for generation of Movie Atom into the memory 8 in correspondence with data of the Movie Data Atom while sequentially outputting data of Movie Data Atom to hold them to generate data sequence of Movie Atom from data held in the memory 8 by responding to completion of recording of Movie Data Atom to output the data sequence thus generated.

The error correction encoder/decoder 9 serves to temporarily write, into the memory 10, multiplexed data which has been inputted to add codes for interleave and error correction thereafter to read out, from the memory, the multiplexed data thus processed to output it to the data modulator/demodulator 11.

The data modulator/demodulator 11 serves to implement a predetermined modulation for performing recording onto the optical disk 20 thereafter to provide an output to the magnetic filed modulation driver 12, and to output, at the same time, a signal for driving the optical head 23. The magnetic field modulation driver 12 serves to drive coil for magnetic filed in accordance with an inputted signal to apply magnetic filed to the optical disk 20. The optical head 23 irradiates laser beams for recording onto the optical disk 20 to record signals onto the optical disk 20. In this example, in the recording operation onto the optical disk 20, since recording processing is performed with respect to intermittent data which are read out from the memory controller 7, continuous recording operation is not usually performed, but such an operation to interrupt recording operation if a predetermined data quantity is recorded to stand by until next recording request is performed. In such operations, the drive control microcomputer 14 outputs a request to the servo circuit 15 in accordance with request from the system control microcomputer 13 to perform control of the entirety of disk drive unit.

In this example, for the optical disk 20 as disk-shaped recording medium, rewritable optical disk such as MO (Magneto-optical) disk or phase change type disk, etc. may be used. The spindle motor 21 rotationally drives the optical disk 20, in accordance with the format of the optical disk 20, by the condition of Constant Linear Velocity (CLV), Constant Angular Velocity (CAV) or Zone Constant Linear Velocity (ZCLV), etc. by control of the servo circuit 15.

The servo circuit 15 controls the operation of the spindle motor 21 on the basis of various signals outputted from the optical head 23 to execute processing of the spindle control. Moreover, the servo circuit 15 similarly performs tracking control and focus control of the optical head 23. The servo circuit 15 serves to seek the optical head 23 and the magnetic filed head 22, and to execute processing such as focus search, etc.

The drive control microcomputer 14 controls the operation such as seek, etc. at the servo circuit 15 by instruction of the system control microcomputer 13.

The optical head 23 irradiates laser beams onto the optical disk 20 to receive rays of return light thereof by a predetermined light receiving element to perform arithmetic (calculation) processing of light receiving result to generate signals for various controls, and to output reproduction signal of which signal level is changed in accordance with pit train and/or mark train which are formed at the optical disk 20. Further, the optical head 23 switches the operation by control of the system control microcomputer 13. In the case where the optical disk 20 is magneto-optical disk, light quantity of laser beams irradiated onto the optical disk 20 at the time of recording is intermittently increased. Namely, in the video disk device 30, image pick-up results are recorded by the so-called pulse train system. In addition, in the case where the optical disk 20 is phase change type disk, etc, the optical head 23 increases light quantity of laser beams irradiated onto the optical disk 20 in accordance with output data of the data modulator/demodulator 11 from light quantity at the time of reproduction to light quantity at the time of write operation to apply thermal recording technique to record image pick-up result onto the optical disk 20.

As stated above, in the video disk device 30, video signal and audio signal which are obtained as image pick-up result are caused to undergo data compression by the video encoder 1 and the audio encoder 2 to convert the compressed data thus obtained into elementary stream thereafter to convert the elementary stream thus obtained into file of the QT format by the file generator 5 to record, onto the optical disk 20, file of the QT format by the optical head 23 and the magnetic filed head 22 through the memory controller 7, the error correction encoder/decoder 9, and the data modulator/demodulator 11 in sequence.

Then, the operation at the time of reproduction in the video disk drive device 30 will be explained.

Namely, in the video disk device 30, at the time of reproduction, laser beams for reproduction are irradiated onto the optical disk 20 by the optical head 23 to perform photoelectric conversion into an electric signal from quantity of beams which have been reflected from the optical disk 20 to obtain a reproduction signal. Also at the time of reproduction, in the case where reproduction is performed at a transfer rate higher than that of multiplexed signal of video data and audio data which are recorded similarly at the time of recording, continuous reproduction is not performed in ordinary state to perform such an operation to interrupt reproducing operation if a predetermined data quantity is reproduced to stand by until next reproduction request. In these operations, similarly at the time of recording operation, the drive control microcomputer 14 outputs request to the servo circuit 15 in accordance with request from the system control microcomputer 13 to perform control of the entirety of the disk drive unit.

A signal which has been reproduced by the optical head 23 is inputted to the data modulator/demodulator 11 to implement a predetermined decode processing. Thereafter, the signal thus processed is temporarily written into the memory 10 through error correction encoder/decoder 9 so that deinterleave and error correction processing by the error correction encoder/decoder 9 are performed. Since the error correction processed data is restored as multiplexed data of video data and audio data, that data is written into the memory 8 through the memory controller 7. The multiplexed data which has been written into the memory 8 is outputted to the file decoder 6 in correspondence with the timing of synchronization for releasing multiplexing in accordance with request of the system control microcomputer 13 so that it is separated into video data and audio data. Moreover, at the file decoder 6, decode operation of real data management information stored at Movie Atom (type name : 'moov') is performed to interpret how to decode and output real data stored in the multiplexed state within media data Atom (type name: 'mdat'). The video data thus separated is decoded by the video decoder 3. The video data thus decoded is outputted as a video signal. Similarly, the audio data is decoded by the audio decoder 4. The audio data thus obtained is outputted as an audio signal.

Here, the system control microcomputer 13 monitors, for the purpose of continuously reproducing video data and audio data, quantity of data which are read out from the memory 8 and are then outputted to the video decoder 3 and the audio decoder 4 and quantity of data which are written into the memory 8 obtained by reproducing signals from the optical disk 20 to make read request of data from the disk with respect to the memory controller 7 and/or the drive control microcomputer 14 so that the memory 8 does not overflow or underflow.

It is to be noted that while explanation has been given on the assumption that the optical disk in this example is magneto-optical disk for performing magnetic field modulation, even if the phase change disk is employed, fundamental operations are the same.

Then, outline of the QT format will be explained.

The QT format is file format generated as extension function of OS (Operating System) for reproducing moving picture, etc. without using special hardware. The QT format is multimedia file format of time base capable of reproducing, in synchronized state, on the time axis, real data of various forms such as moving picture, sound, still picture, character and/or MIDI, etc., and is adapted to have ability to comply with streaming on the network.

In the QT file, real data by these various forms are respectively stored in a form of individual tracks as media data. The track of real data by moving picture, the track of real data by sound and the track of real data by character are respectively called video track, sound track (audio track) and text track. Management of these data is rigorously performed on the time axis. It is to be noted that there is, in addition to the above, as the QT file, MPEG2-PS (Program Stream) track for performing management of data in which video data and audio data are multiplexed, e.g., MPEG2-PS data.

The QT file is roughly divided into Movie Atom (type name: 'moov') and Movie Data Atom (type name: 'mdat'). Movie Data Atom is formed by set of tracks. Management information of respective tracks of Movie Data Atom, etc. are collected so that Movie Atom is formed.

It is to be noted that Atom may be represented as Box as occasion may demand. Moreover, Movie Atom may be represented as Movie Resource as occasion may demand. Further, Media Data Atom may be represented as Movie Data as occasion may demand.

In Movie Atom, there are stored time information for reproducing file of the QT base and location information necessary for referring real data ('mdat'), etc. In Media Data Atom, there are stored video and/or audio real data. It is to be noted that the file format of the QT base has no necessity that 'moov' and 'mdat' are stored within one file in the closed state, and management information for designating, by using, e.g., relative path or absolute path on recording medium, external file name including media data caused to undergo external reference may be stored so that media data existing in other files can be referred.

Figure 2:
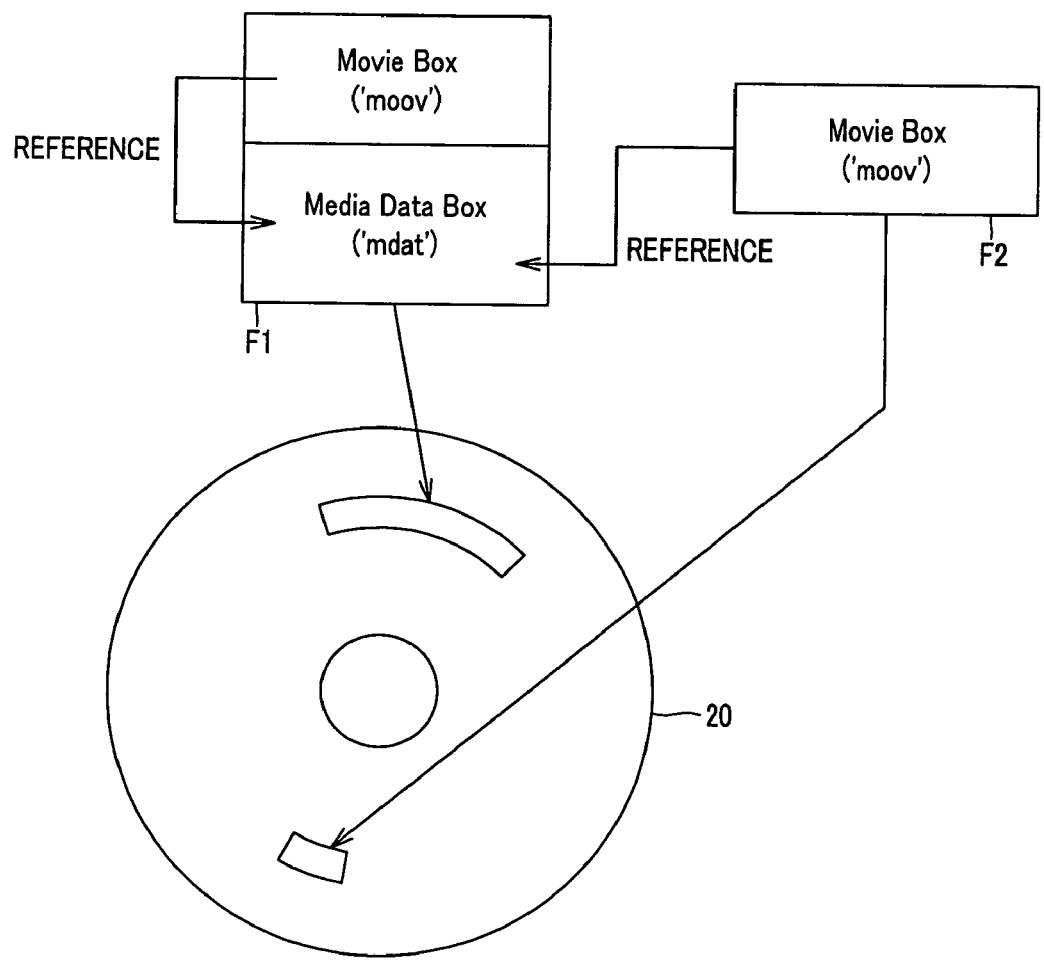
FIG. 2 is a view showing an example of the structure in which file of QT base recorded on optical disk is simplified.

Here, an example of the structure of file of QT base recorded on the optical disk 20 is shown in FIG. 2 in a simplified manner.

On the optical disk 20 shown in FIG. 2, there are recorded two kinds of QT files F1, F2. One QT file F1 is self-inclusive type file having, as set, Movie Atom and Media Data Atom. Another QT file F2 is external reference type file consisting of only Movie Atom as file and for referring real data within another file.

Figure 3:
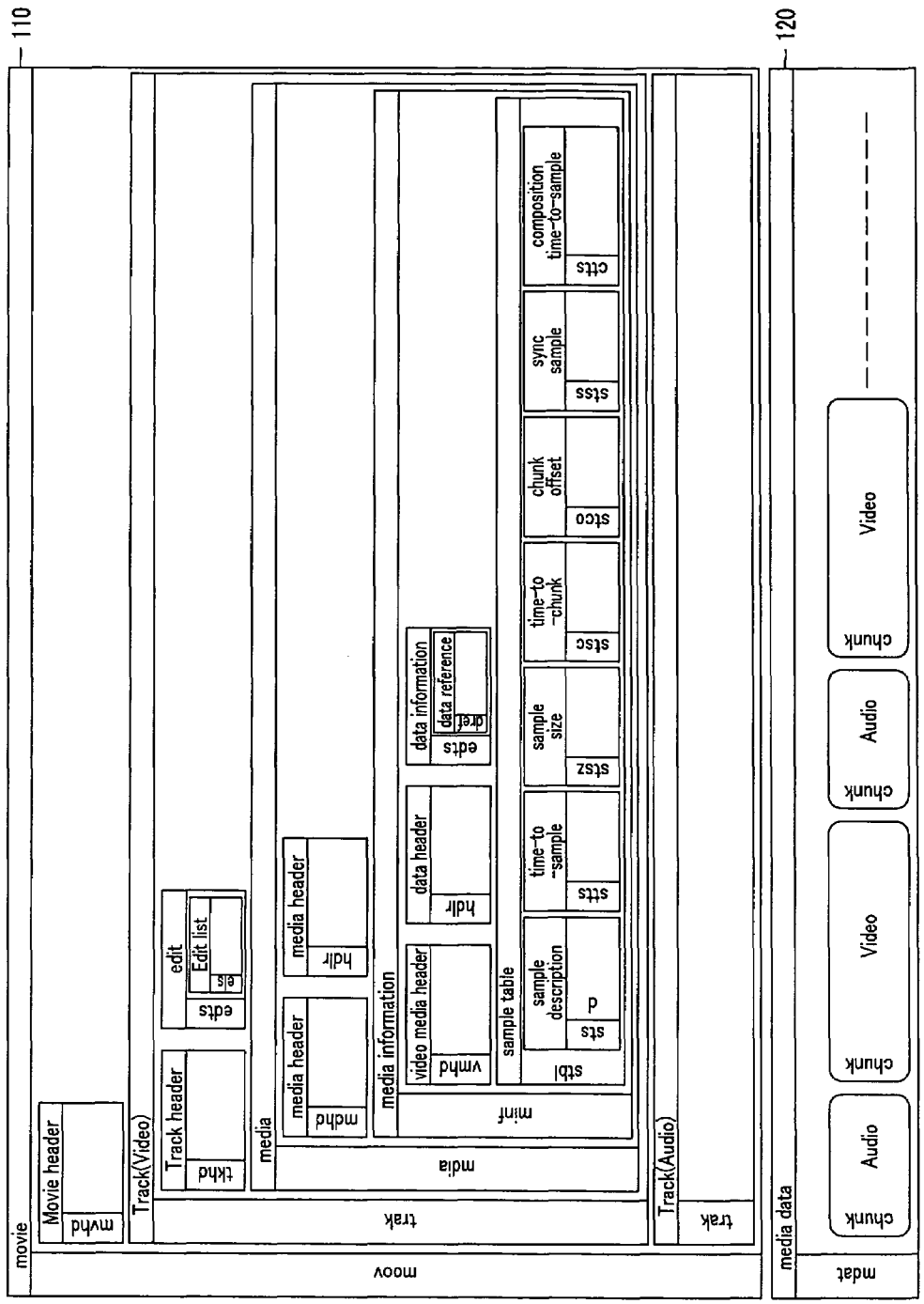
FIG. 3 is a view showing the structure of file of QT base which handles audio data and image data.

Then, the structure of file of QT base which handles audio data and image data is shown as an example in FIG. 3.

The most important portion is Movie Atom 110 and Media Data Atom 120. In the Movie Atom, there are stored time information necessary for reproducing corresponding file and/or location information for real data reference, etc. Moreover, in the Media Data Atom 120, there are stored video and/or audio real data, etc.

In the Movie Atom 110, plural layers called Track for respectively storing Media Data of different types such as sound, video and/or text as different tracks exist as occasion demands. Respective Tracks have media hierarchy for performing management of compression system, storage location and/or display time of respective real data. Among layers, in the Media Data Atom 120 where real data are stored, there are stored information such as size of Sample of management minimum unit indicating the state of unit in which data are stored, chunk in which several Samples are collected so that block is provided, storage location of the chunk and display times of respective Samples, etc.

Further, the Movie Atom 110 has hierarchical structure of track Atom ('trak') which describes information relating to data every track which is stored in the Media Data Atom 120. Moreover, the Track Atom has the hierarchical structure of Media Atom ('mdia') which describes information relating to real data actually used at corresponding track. The Media Atom has the hierarchical structure of Media information Atom ('minf') which describes information represented by corresponding media type. The Media Information Atom has the hierarchical structure of sample Table Atom ('stbl') which describes information relating to Sample which is the minimum management unit of real data of corresponding media. It is to be noted that the Movie Atom diagram describes the detail in connection with one video track, and similar structure is described in connection with audio track although illustration is omitted.

In the Movie Atom 110, there is included Movie Header Atom ('mvhd') which describes header information relating to the entirety of file.

In the Track Atom, there are included T track header Atom ('tkhd') which describes header information relating to the entirety of track, and edit Atom ('edts') which describes information relating to time relationship with respect to media constituting tracks. In the Edit Atom, there is included Edit list Atom ('elst') which describes the relationship between time axis of track and time axis of media.

In the Media Atom 110, there are included Media Header Atom ('mdhd') which describes header information relating to the entirety of media, and handler reference Atom ('hdlr') which describes information relating to handling every media.

In the Media Information Atom, in the case of video track, there are included Video Media Header Atom ('vmhd') which describes header information relating to video media, handler reference Atom ('hdlr') which describes information relating to handling of corresponding data, and data information Atom ('dinf') which describes information relating to storage destination of data to be referred in practice. In the Data Information Atom, there is included data reference Atom ('dref') which describes information relating to storage method, location and/or file name of real data to be referred. It is to be noted that, in the case of audio track, sound media header Atom ('smhd') which describes header information relating to sound media is included in place of Video Media Header Atom ('vmhd').

In the Sample Table Atom, there are stored sample description Atom ('stsd') which performs description of information relating to compression system and/or the characteristic of respective Samples, time sample Atom ('stts') which describes the relationship between respective Samples and time, sample size Atom ('stsz') which describes data quantities of respective samples, sample chunk Atom ('stsc') which describes the relationship between Chunks and Sample constituting the Chunks, Chunk offset Atom ('stco') which describes leading positions of respective Chunks from the file leading point, sync sample Atom ('stss') which describes random accessibility of respective Samples, and composition time sample Atom ('ctts') which describes the relationship between respective Samples and time on the display, etc.

Here, the example in which Atom structure substantially equivalent is described as a list in a manner of C language is shown in Table 1.

It is to be noted that the structure shown by using FIG. 3 and Table 1 is an example of file structure in which QT format is used as base, and Atom types used also exist except for the structure shown here, but main Atom type is shown.

On the contrary, in the Media Data Atom, audio data encoded by the compression encoding system based on, e.g., MPEG 1 Audio Layer2 and image data encoded by the compression encoding system in accordance with, e.g., MPEG2 Video provision are respectively stored with Chunk consisting of a predetermined number of Samples being as unit. It is a matter of course that the encoding system is not limited to the above-mentioned encoding system, but, e.g., Motion JPEG, Motion JPEG 2000, MPEG 4, AVC (Advanced Video Coding: MPEG4-part 10) may be used and Dolby AC3 and/or ATRAC (Adaptive Transform Acoustic Coding), etc. may be employed in the case of audio data, and linear data to which compression encoding is not implemented may be also stored.

Then, the example in which Atom structure of QT base including video Effect in the present invention is described as a list in a manner of C language is shown in Tables 1 and 2.

TABLE 1

| Atom | Type |
|---|---|
| Movie atom { | 'moov' |
|   Movie Header atom | 'mvhd' |
|   Track atom (video) { | 'trak' |
|     Track Header atom | 'tkhd' |
|     Edit atom { | 'edts' |
|       Edit List atom | 'elst' |
|     } | |
|     Media atom { | 'mdia' |
|       Media Header atom | 'mdhd' |
|       Media Handler Reference atom | 'hdlr' |
|       Media Information atom { | 'minf' |
|         Video Media Information Header atom | 'vmhd' |
|         Data Handler Reference atom | 'hdlr' |
|         Data Information atom { | 'dinf' |
|           Data Reference atom | 'dref' |
|         } | |
|         Sample Table atom { | 'stbl' |
|           Sample Description atom | 'stsd' |
|           Time-to-Sample atom | 'stts' |
|           Sample Size atom | 'stsz' |
|           Sample-to-Chunk atom | 'stsc' |
|           Chunk Offset atom | 'stco' |
|         } | |
|       } | |
|     } | |
|   } | |
|   Track atom (effect) { | 'trak' |
|     Track Header atom | 'tkhd' |
|     Edit atom { | 'edts' |
|       Edit List atom | 'elst' |
|     } | |
|     Track Reference atom { | 'tref' |
|       Track Reference Type atom | 'ssrc' |
|     } | |
|     Media atom { | 'mdia' |
|       Media Header atom | 'mdhd' |
|       Media Handler Reference atom | 'hdlr' |
|       Media Information atom { | 'minf' |
|         Video Media Information Header atom | 'vmhd' |
|         Data Handler Reference atom | 'hdlr' |
|         Data Information atom { | 'dinf' |
|           Data Reference atom | 'dref' |
|         } | |
|         Sample Table atom { | 'stbl' |

TABLE 1-continued

| Atom | Type |
|---|---|
|           Sample Description atom | 'stsd' |
|           Time-to-Sample atom | 'stts' |
|           Sample Size atom | 'stsz' |
|           Sample-to-Chunk atom | 'stsc' |
|           Chunk Offset atom | 'stco' |
|         } | |
|       } | |
|       Track Input Map atom { | 'imap' |
|         QTatom container { | 'sean' |
|           Track Input QTatom { | ' in' |
|             Input Type QTatom | ' ty' |
|             Data Source Type QTatom | 'dtst' |
|           } | |
|         } | |
|       } | |
|     } | |
|   } | |
| } | |
| Movie Data atom | 'mdat' |

TABLE 2

| Atom | Type |
|---|---|
| Movie atom { | 'moov' |
|   Movie Header atom | 'mvhd' |
|   Track atom (video 1) { | 'trak' |
|     Track Header atom | 'tkhd' |
|     Edit atom { | 'edts' |
|       Edit List atom | 'elst' |
|     } | |
|     Media atom { | 'mdia' |
|       Media Header atom | 'mdhd' |
|       Media Handler Reference atom | 'hdlr' |
|       Media Information atom { | 'minf' |
|         Video Media Information Header atom | 'vmhd' |
|         Data Handler Reference atom | 'hdlr' |
|         Data Information atom { | 'dinf' |
|           Data Reference atom | 'dref' |
|         } | |
|         Sample Table atom { | 'stbl' |
|           Sample Description atom | 'stsd' |
|           Time-to-Sample atom | 'stts' |
|           Sample Size atom | 'stsz' |
|           Sample-to-Chunk atom | 'stsc' |
|           Chunk Offset atom | 'stco' |
|         } | |
|       } | |
|     } | |
|   } | |
|   Track atom (video 2) { | 'trak' |
|     Track Header atom | 'tkhd' |
|     Edit atom { | 'edts' |
|       Edit List atom | 'elst' |
|     } | |
|     Media atom { | 'mdia' |
|       Media Header atom | 'mdhd' |
|       Media Handler Reference atom | 'hdlr' |
|       Media Information atom { | 'minf' |
|         Video Media Information Header atom | 'vmhd' |
|         Data Handler Reference atom | 'hdlr' |
|         Data Information atom { | 'dinf' |
|           Data Reference atom | 'dref' |
|         } | |
|         Sample Table atom { | 'stbl' |
|           Sample Description atom | 'stsd' |
|           Time-to-Sample atom | 'stts' |
|           Sample Size atom | 'stsz' |
|           Sample-to-Chunk atom | 'stsc' |
|           Chunk Offset atom | 'stco' |
|         } | |
|       } | |
|     } | |
|   } | |

TABLE 2-continued

| Atom | Type |
|---|---|
| Track atom (effect) { | 'trak' |
|   Track Header atom | 'tkhd' |
|   Edit atom { | 'edts' |
|     Edit List atom | 'elst' |
|   } | |
|   Track Reference atom { | 'tref' |
|     Track Reference Type atom | 'ssrc' |
|   } | |
|   Media atom { | 'mdia' |
|     Media Header atom | 'mdhd' |
|     Media Handler Reference atom | 'hdlr' |
|     Media Information atom { | 'minf' |
|       Video Media Information Header atom | 'vmhd' |
|       Data Handler Reference atom | 'hdlr' |
|       Data Information atom { | 'dinf' |
|         Data Reference atom | 'dref' |
|       } | |
|       Sample Table atom { | 'stbl' |
|         Sample Description atom | 'stsd' |
|         Time-to-Sample atom | 'stts' |
|         Sample Size atom | 'stsz' |
|         Sample-to-Chunk atom | 'stsc' |
|         Chunk Offset atom | 'stco' |
|       } | |
|     } | |
|     Track Input Map atom { | 'imap' |
|       QTatom container { | 'sean' |
|         Track Input QTatom { | ' in' |
|           Input Type QTatom | ' ty' |
|           Data Source Type QTatom | 'dtst' |
|         } | |
|         Track Input QTatom { | ' in' |
|           Input Type QTatom | ' ty' |
|           Data Source Type QTatom | 'dtst' |
|         } | |
|       } | |
|     } | |
|   } | |
| } | |
| Movie Data atom | 'mdat' |

It is to be noted that Atom structure shown by using FIG. 3 and Tables 1 and 2 is an example of the file structure in which the QT format is used as base, and Atom types used exist except for the structure shown here, but main Atom type is shown.

On the contrary, in the Media Data Atom, audio data encoded by the compression encoding system based on, e.g., MPEG1 Audio Layer 2 and image data encoded by the compression encoding system based on, e.g., MPEG2 Video provision are respectively stored with Chunk consisting of a predetermined number of samples being as unit. It is a matter of course that the encoding system is not limited to these encoding systems, but, e.g., Motion JPEG, Motion JPEG2000, MPEG4, AVC (Advanced Video Coding: MPEG4-part 10), and Dolby AC3 and/or ATRAC (Adaptive Transform Acoustic Coding), etc. may be employed in the case of audio data, and linear data to which compression encoding is not implemented may be stored.

The file shown in the Table 1 is elementary file including Effect track in which a desired video Effect is implemented to one video track serving as object track (source track) to which Effect is to be implemented, which is called One-source Effect in the QT. For Effect example realized, there are mentioned monochrome, cepia color conversion, gradation (shading-off) and/or mosaic, etc. as filter effect example with respect to one video source.

Moreover, the file shown in the Table 2 is elementary file including Effect track to which a desired video Effect is implemented with respect to two video tracks serving as object track (source track) to which Effect is implemented, which is called Two-source Effect in the QT. For Effect example, there are mentioned wipe and/or cross fade, etc. as transition effect example between two video sources.

It is to be noted that since video Effect is handled as subject in the embodiment, audio tracks are not described in the Drawing. Moreover, in the track serving as input source for the above-described Effect, video data and audio data are multiplexed in addition to the video track. For example, MPEG-PS track is used as subject.

In the Tables 1 and 2, when viewed from the medium type, the Effect track is handled as video media similarly to the ordinary video track. Accordingly, the structure below Track Atom is substantially the same, and there exists Atom structure in which only two points mentioned below are required as supplement for realizing function as Effect track.

For Track Atom of Effect track, there is required track reference Atom ('tref') which describes information for designating reference relationship with respect to source track to which Effect is to be implemented. In the Track Reference Atom, there is included track reference type Atom ('ssrc') for designating track ID specific to track which is stored in Track Header Atom of track to be designated in order to designate source track in practice. In this example, in the case of One-source Effect in which the number of source tracks is one, the No. of track IDs to be stored at Track Reference Type Atom is one. In the case of Two-source Effect in which the No. of source tracks is two, the No. of track IDs is two.

Moreover, for Media Atom of Effect track, there is required track input map Atom ('imap') which describes information relating to source track to which Effect is to be implemented for the Effect track and which is input for the Effect track. The Track Input Map Atom is caused to be of the configuration called QT Atom structure in the QT slightly different from the Atom structure which have appeared until now. Plural Track Input QT Atoms ('in') packed by container using QT Atoms container ('sean') as uppermost layered Atom are included as occasion demands. In the Track Input QTatom, there are included Input type QTatom ('ty') for designating that input source is video media, and data source type QTatom ('dtst') which gives specific name to source track.

In this example, as shown in the Tables 1 and 2, in the case of One-source Effect in which No. of source tracks is one, No. of Track Input QTatom is one. In the case of Two-source Effect in which No. of source tracks is two, the No. of Track Input QTatoms is two.

It is to be noted that, although the detail thereof is omitted, real data of Effect track is stored into Movie Data Atom every Effect samples similarly to video data of source track. As data of Effect track to be stored, parameter data for Effect processing which has been defined every Effect kind, which is set in the data format field within Sample Description Atom of Effect track which will be explained below, are stored as occasion demands.

Here, as realization example of One-source Effect illustrated in the Table 1, the track configuration in Movie file, outline of Movie Atom structure, and outline of Movie Data Atom structure are shown in (A) to (C) of FIG. 4.

In this example, a desired filter Effect is implemented to one source track shown in (A) of FIG. 4 for a certain specific time period of the track by Movie Atom shown in (C) of FIG. 4 in accordance with Effect parameter data shown in (B) of FIG. 4, and Null Effect is implemented for time periods except for the above-mentioned specific time period. Effect which is ineffective seemingly, which is realized by setting specific parameters every specific kinds, is called Null effect.

In this realization example, the No. of source tracks is one. In order to designate that source track, track reference Atom ('tref') is used to designate [1] as track ID No. of the source track, and Track Input Map Atom ('imap') is used to give 'srcA' as name specific to source.

Moreover, as realization example of Two-source Effect illustrated in the Table 2, the track configuration in Movie file, outline of Movie Atom structure, and outline of Movie Data Atom structure are shown in (A) to (C) of FIG. 5.

In this example, Two-source tracks shown in (A) of FIG. 5 and (B) of FIG. 5 are used to implement desired transition Effect to specific time period during those tracks overlap with each other by Movie Atom shown in (B) of FIG. 5 in accordance with Effect parameter data shown in (C) of FIG. 5, and Null effect is implemented to either source track for time periods except for the specific time period. In this realization example, in the case where the No. of source tracks is two (2), first source track is designated as 1 and second source track is designated as 2 as Track ID No. of these source tracks, and 'srcA' is given to first name specific to source, and 'scrB' is given to second name thereof.

In this example, the time period during which a desired Effect (Effect kind 2) is implemented is shown as half-tone dot meshing in (B) of FIG. 4 and (B) of FIG. 5. For time period except for half-tone dot meshing, setting is made to give standard value as Effect parameter which will be described later for a certain specific Effect (Effect kind 1) with respect to the first or second source track so that Effect does not seemingly appear. Moreover, the Effect track has three Effect examples, wherein the first and third Effect samples are sample of the Effect kind 1, and the second Effect sample is sample of the Effect kind 2.

In such QT file, as the relationship between Movie Atom (Movie Resource) and Movie Data Atom according to the One-source effect and the Two-source effect are respectively shown in (C) of FIG. 4 and (C) of FIG. 5, it is possible to specify source tracks ST1, ST2 by Track Reference Atom (tref) and Track Input map Atom (imap) of Effect track ET. In this example, (A) of FIG. 4 to (C) of FIG. 4, and (A) of FIG. 5 to (C) of FIG. 5 show, by comparison with Effect track, the relationship between video data according to real data and processing of Effect.

Then, multiple Effect in QT will be explained.

The multiple Effect is called Stack Effect in QT. Effect track in which original video track is used as source track is permitted to be source track of another Effect track. As Effect example realized, there is mentioned Effect in which gradation (shading) is implemented to cepia color converted track.

The ordinary Effect uses original video track as source track of Effect track. However, the multiple Effect is realized by constituting track reference Atom ('tref') and track Input Atom ('imap') similarly to the ordinary Effect except that Effect track is used as source track. It is to be noted that, in order to realize multiple Effect, the points described below are different in Sample Table Atom.

For Effect track used as source track of another effect, extension Atom is required in Sample Description Entry Table stored within corresponding Sample Description Atom ('stsd').

Here, explanation will be given in connection with this point in concrete manner.

Primarily, in the Sample Description Atom ('stsd') in the Effect track, there exists data format field for designating compression encoding system in the video track. In this field, four characters alphabets (four bytes) are used as ASCII code to designate compression encoding system. In the Effect track of QT, information indicating Effect kind is stored into this field similarly as four character alphabets in place of the compression encoding system.

In order to realize multiple Effect, it is necessary to perform extensive addition of image Description Extension Describing Sample format Atom ('idfm') into Sample Description Entry of Effect track used as source track of another Effect track. The type name of the extension Atom is 'idfm'. The extension Atom has one data field of four bytes and designates four character alphabets of 'fxat'. The Effect track having the data field can be utilized as source track of Effect track.

The structure of the inside of Atom including Sample Description Atom ('stsd') which describes characteristic or attribute, etc. of Sample of ordinary Effect track which is not multiple or Effect track which is not used as source track of another Effect track, and Sample Description Entry Table stored therein is shown in Table 3.

TABLE 3

Sample Description atom {
    (4) Size
    (4) Type(='stsd')
    (1) Version
    (3) Flags
    (4) Number of Entries
  (112) Effect Sample Description entry#1
           :
  (112) Effect Sample Description entry#M
}
Effect Sample Description entry {
    (4) Size
    (4) Data Format
    (6) Reserved
    (2) Data Reference Index
    (2) Version
    (2) Revision Level
    (4) Vendor
    (4) Temporal Quality
    (4) Spatial Quality
    (2) Width
    (2) Height
    (4) Horizontal Resolution
    (4) Vertical Resolution
    (4) Data Size
    (2) Frame Count
  (32) Compressor Name
    (2) Depth
    (2) Color Table ID
}

In the Sample Description Atom (sample description) of video track, Size, type name (stsd), version and flag of Sample Description Atom (sample description) are assigned in succession. Moreover, number of Entries of Sample Description Atom (sample description) is assigned, and data compression system and entry by related information (Videosample description entry) are assigned by the number of Entries.

Further, in respective entries (Video sample description entry), Sizes of respective entries (Videosample description entry) are assigned, and data compression system is described by the subsequent Data Format. In this example, in respective entries (Video sample description entry), field (Frame Count), etc. which describes number frames assigned to one sample is assigned as information related to the Data Format.

Sample Description Atom having the same structure as that of the Table 3 and used as source track of different Effect track at the time of multiple Effect is similarly shown in Table 4.

TABLE 4

Sample Description atom {
    (4) Size
    (4) Type(='stsd')

TABLE 4-continued

```
    (1) Version
    (3) Flags
    (4) Number of Entries
    (112) Effect Sample Description entry#1
            :
    (112) Effect Sample Description entry#M
}
    Effect Sample Description entry {
        (4) Size
        (4) Data Format
        (6) Reserved
        (2) Data Reference Index
        (2) Version
        (2) Revision Level
        (4) Vendor
        (4) Temporal Quality
        (4) Spatial Quality
        (2) Width
        (2) Height
        (4) Horizontal Resolution
        (4) Vertical Resolution
        (4) Data Size
        (2) Frame Count
        (32) Compressor Name
        (2) Depth
        (2) Color Table ID
    /* Data Format extension atom */
        (12) Image Description Extension Describing Sample Format Atom
}
    Image Description Extension Describing Sample Format Atom {
        (4) Size
        (4) Type(='idfm')
        (4) Data (='fxat')
    }
```

In Sample Description Atom (sample description) of Effect track, as shown in the Table 4, by comparison with the Table 3, similarly to Sample Description Atom (sample description) of video track, Size, type name (stsd), version, flag and number of Entries are assigned, and entry according to Effects (Effect sample description entry) are subsequently assigned by a predetermined number of Effects.

In the entry according to respective Effects (Effect sample description entry), the same fields as entries in video track such as reserve and/or data reference index, etc. are further successive, and extension Atom prepared for the purpose of describing extension information of data format is assigned to the end.

In this example, in the above-mentioned Tables 3 and 4, data quantities of respective fields are indicated by the number of bytes in parenthetic form.

Here, in the present invention, there is performed convenience realized by preparing plural Movie Atoms different in reproduction purpose at the time of recording image and sound. Explanation will be given by taking, as an example, the case where two Movie Atoms of Movie Atom for original Movie and Movie Atom for Movie in which Effect has been implemented to that Movie are prepared at the same time in performing record photographing of image and sound onto disk by camcoder.

In the following explanation, these two Movie Atoms take a system for performing external reference of the same Movie Data Atom.

First, outline will be explained. During record photographing operation, Movie Data Atoms which are actual form of video data and audio data which have been encoded are sequentially recorded onto the optical disk 20. At the same time, Movie Data Atom having only video track for original Movie are sequentially recorded into the memory 8. Further, at the same time, Movie Atom for Movie having video track and Effect track are sequentially recorded into the memory 8. At the same time when Movie Data Atom is completed at the time point when record photographing operation is completed, two Movie Atoms are written from the memory 8 onto the optical disk 20 so that Movie Atom has been completed. The track configuration of Movie Atom having only video track for original Movie at this time is as shown in FIG. 22 which will be described later. Namely, there is provided Movie Atom having only one original track. Moreover, the track configuration of Movie Atom for Movie having video Effect and Effect track is as shown in FIG. 22D. The Movie Atom consists of source track and Effect track which perform management of original Movie.

With respect to Movie Atom for Movie to which Effect has been implemented, information of selection of Effect and/or ON/OFF of Effect by instruction from user at the time of recording or reproduction of image and sound are reflected with respect to management information of Effect track of Movie Atom at the time of completion of recording or reproduction.

Data of Movie Atom is not only recorded in the actual form state within the memory at the time of record photographing operation, but also may be recorded after undergone encoding. Moreover, there is the possibility that information common to both Atoms of Movie Atom for original Movie and Movie Atom for Movie in which Effect has been implemented to the Movie may be shared within the memory 8.

Then, an example with respect to the detail of Effect edit at the time of recording photographing and at the time of reproduction is shown. The program at the time of recording photographing and at the time of reproduction to be installed is divided into the main part and the user input part. The main part shares rough flow at the time of record photographing operation. The user input part shares the portion which issues user request by the state of user interface.

The video disk camera 100 within which the video disk device 30 is mounted comprises, as shown in FIG. 6, for example, various operation buttons such as a recording start button 41, a reproduction start button 42, a stop button 43, an Effect button 44, an Effect kind/parameter change button 45, and a mark button 46, etc. as user interface.

The video disk camera 100 comprises an image pick-up lens 47, and further comprises a disk drive unit 48.

First, the Table used in installed program necessary for explanation and user interface of the video disk camera 100 will be explained. At the main part, the Effect period Table, the mark Table and the Effect switch are used. Those components will be explained.

As shown in FIG. 7, the Effect period Table describes what Effect of kind/parameter is implemented and period in which the Effect employed is implemented in Movie having Effect track to be reproduced or picture-recorded, and is placed (stored) in the Memory 8. Moreover, One Effect table exists per one Effect track within Movie Atom. In the case of Movie Atom having a large number of Effect tracks, the same number of Effect period tables as above exist. The time period during which Effect is not implemented (Null effect period) is not described in the Table. In the case of deleting Effect, such deletion is performed by registering "Effect release" as Effect period. In the case where Effect period is added to the Effect period Table, Effect period to be added is added as the last entry.

Here, the processing for performing arrangement of the Effect period Table will be explained.

Figure 9A:
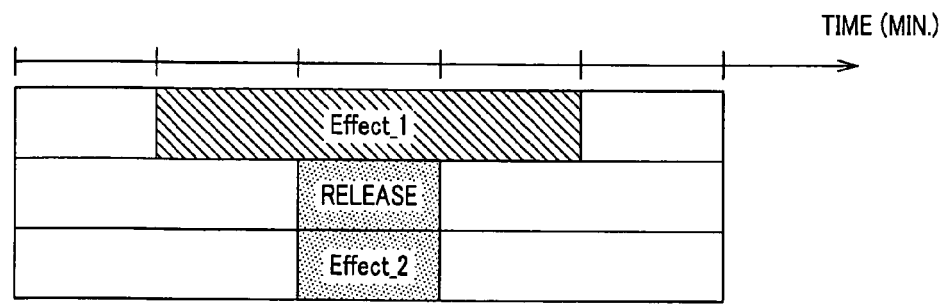

In the state of the Effect period Table as shown in FIG. 8A, Effect period entries overlap with each other as shown in FIG. 9A.

Figure 9B:
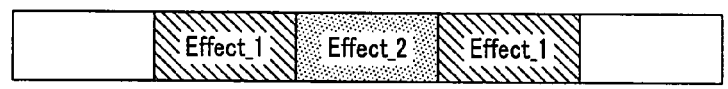

In view of the above, the above-mentioned Effect period Table arrangement is performed as shown in FIG. 8. Thus, as shown in FIG. 9B, there results the state where Effect period entries do not overlap with each other.

In the case where periods overlap with each other as stated above, arrangement of the Effect period Table is performed so that it is re-constructed.

In the arrangement from the state of FIG. 8A to the state of FIG. 8B, there is no Effect from the first (Null Effect) at 00:01:00 to 00:02:00 period. At the 00:01:00 to 00:02:00 period, Effect_1 remains as it is. At the period of 00:01:00 to 00:02:00, Effect_1 results in Null Effect by Effect release. Further, Effect_2 is embedded thereinto. Resultantly, Effect_is overwritten by Effect_2. At the period of 00:03:00 to 00:04:00, Effect_1 remains as it is. At the 00:04:00 to 00:05:00 period, there is no Effect from the first (Null Effect). Arrangement is performed by such rule.

Figure 9C:
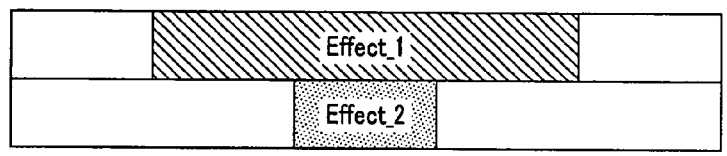
Figure 9D:
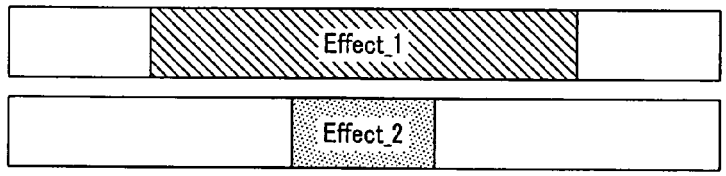

Moreover, when arrangement of the Effect period Table shown in FIG. 8C which gives Effect as shown in FIG. 9C is performed, there results the state as shown in FIG. 8D. Namely, in the case where even if arrangement of Effect period is performed, overlap remains, Effect period Table is newly prepared to move Effect period entry which has been added from the last into Effect period Table. Plural Tables respectively result in management information of plural Effect tracks. The Effect period Tables 1, 2 shown in FIG. 8D give Effect 1 and Effect 2 shown in FIG. 8D.

In actual processing, registration of one entry with respect to the Effect period Table is performed in the state divided into two times of the time when Effect is turned ON and the time when Effect is turned OFF. They are respectively called Effect period registration processing A and Effect period registration processing B. For such processing, there are two kinds of processing of the multiple Effect type and the overwrite type.

In the Effect period registration processing A of the multiple Effect type, as shown in FIG. 10, there is performed processing SA to add entry of Effect period table to write Effect start time and kind with respect to the Table.

In the Effect period registration processing A of the multiple type, as an example of the state of the Effect period Table immediately after processing is shown in FIG. 11, desired Effect kind/parameter and start time are registered into the Effect period Table, and any data is not inserted into duration.

Further, in the Effect period registration processing B of the multiple Effect type, there is performed processing SB to calculate Effect duration to record the Effect duration thus recorded into the Effect period Table.

In the Effect period registration processing B of the multiple type, duration is registered as shown in FIG. 12 as an example of the state of Effect period Table immediately after processing is shown in FIG. 13.

On the contrary, in the Effect period registration processing A of the overwrite type, as shown in FIG. 14, there is performed processing SA1 to add entry of Effect period Table to release kind to write start time into the Table, and there is further performed processing SA2 to add entry of Effect period Table to store Effect start time and kind for a desired Effect into the Table.

In the Effect period registration processing A of the overwrite type, as an example of the state of the Effect period Table immediately after processing is shown in FIG. 15, two entries of Effect release and desired Effect are added to the Effect period Table. Effect kind/parameter and start time are registered both into two entries, and any data is not inserted into duration.

Further, in the Effect period registration processing B of the overwrite type, as shown in FIG. 16, there is performed processing SB1 to calculate Effect duration to record the Effect duration thus calculated into the Effect period Table for Effect release, and there is further performed processing SB2 to calculate Effect duration to record the Effect duration thus calculated into the Effect period Table for desired Effect.

In the Effect period registration processing B of the overwrite type, as an example of the state of the Effect period Table immediately after processing is shown in FIG. 17, duration is registered with respect to two entries.

Further, as shown in FIG. 18, the mark Table is a Table for registering time from reproduction or picture recording when picture recording start button, registration start button, stop button or mark button is pushed down.

Here, there is employed such a method of selecting kind of Effect and parameter that developer has prepared by preset as kind of Effect and/or parameter from preset by Effect kind/parameter change button. Among them, in addition to gradation (shading-off), weak, mosaic and/or small, etc., there is also calculated Effect release used in the case where arbitrary Effect period is deleted.

The Effect switch is variable indicating ON (Effect is implemented)/OFF (Effect is not implemented). Every time Effect button 44 provided as user interface at the video disk camera 100 is pushed down, the state of ON/OFF toggles.

Then, the user input part will be explained.

The user input part is function commonly called from the main part, and serves to perform a processing to read the states of recording start button 41, reproduction start button 42, stop button 43, Effect button 44 and/or Effect kind/parameter change button 45 to issue user request.

Namely, first, at step S1, past picture recording request, past reproduction request, past stop request, user request and/or mark request are cleared.

At the subsequent step S2, button state of the user interface is acquired.

Further, at the subsequent step S3, whether or not recording start button 41 is pushed down is judged.

In the case where judgment result at the step S3 is YES, i.e., recording start button 41 is pushed down, processing proceeds to step S4 to issue picture recording start request to proceed to step S5.

Moreover, in the case where judgment result at the step S3 is No, i.e., the recording start button 41 is not pushed down, processing proceeds to step S5.

At the step S5, whether or not the reproduction start button 42 is pushed down is judged.

In the case where the judgment result at the step S5 is YES, i.e., the reproduction start button 42 is pushed down, processing proceeds to step S6 to issue reproduction start request to proceed to the step S7.

Moreover, in the case where judgment result at the step S5 is NO, i.e., the reproduction start button 42 is not pushed down, processing proceeds to step S7.

At the step S7, whether or not the stop button 43 is pushed down is judged.

In the case where judgment result at the step S7 is YES, i.e., the stop button 43 is pushed down, processing proceeds to step S8 to issue stop start request to proceed to step S9.

Further, in the case where the judgment result at the step S7 is NO, i.e., the stop button 43 is pushed down, processing proceeds to the step S9.

At the step S9, whether or not the Effect button 44 is pushed down is judged.

In the case where the judgment result at the step S9 is YES, i.e., the Effect button 44 is pushed down, processing proceeds to step S10 to judge whether or not the Effect switch is in ON state.

In the case where the judgment result at the step S10 is YES, i.e., the Effect switch is in ON state, processing proceeds to step S11 to turn the Effect switch OFF to proceed to step S13.

Moreover, in the case where the judgment result at the step S10 is NO, i.e., the Effect switch is in OFF state, processing proceeds to step S12 to turn the Effect switch ON to proceed to step S13.

Further, in the case where the judgment result at the step S9 is NO, i.e., the Effect button 44 is not pushed down, processing proceeds to the step S13.

At the step S13, whether or not the Effect kind/parameter change button 45 is pushed down is judged.

In the case where the judgment result at the step S13 is YES, i.e., the Effect kind/parameter change button 45 is pushed down, processing proceeds to step S14 to change Effect kind/parameter to proceed to step S15.

Moreover, in the case where the judgment result at the step S13 is NO, i.e., Effect kind/parameter change button 45 is not pushed down, processing proceeds to the step S15.

At the step S15, whether or not the mark button 46 is pushed down is judged.

In the case where the judgment result at the step S15 is YES, i.e., the mark button 46 is pushed down, processing proceeds to step S16 to issue mark request to complete user input processing.

In addition, in the case where the judgment result at the step S15 is NO, i.e., the mark button 46 is not pushed down, user input processing is immediately completed.

Then, the main part will be explained.

An example of processing in which an arbitrary Effect period is prepared at a time when the Effect is arbitrary by instruction from user at the time of record photographing operation, and no Effect is implemented continuously from photographing start to end thereof is shown. The main part performs this processing in accordance with the procedure shown by the flowchart of FIG. 20.

Namely, at step S21, user input by the user input part is performed.

At the subsequent step S22, whether or not picture recording start request is made is judged.

In the case where the judgment result at the step S22 is No, i.e., there is no picture recording start request, processing returns to the step S21 to repeat the processing of the steps S21 and S22 to stand by until picture recording request is given from user.

When the judgment result at the step S22 is YES, i.e., there is picture recording start request, processing proceeds to the subsequent step S23.

At the step S23, whether or not the Effect switch is in ON state is judged.

When the judgment result at the step S23 is NO, i.e., the Effect switch is in OFF state, processing proceeds to step S25 as it is.

Further, when judgment result at the step S23 is YES, i.e., the Effect switch is in ON state, processing proceeds to step S24 to perform the above-described Effect period registration processing A, i.e., to record Effect kind/parameter and start time at that time point into the Effect period Table.

At the step S25, video/audio data is recorded onto the optical disk 20 which is storage as Movie Data Atom.

At the subsequent step S26, management information of image and sound are recorded into mounted memory 8 as Movie Atom.

At the subsequent step S27, user input by the user input part is performed.

At the subsequent step S28, whether or not Effect button 44 is pushed down as user input at the step S27 so that the state of the Effect switch is changed is judged.

When the judgment result at the step S28 is NO, i.e., the state of the Effect switch is not changed, processing proceeds to step S32 as it is.

Further, in the case where the judgment result at the step S28 is YES, i.e., the state of the Effect switch is changed, processing proceeds to step S29 to judge whether or not the Effect switch is in ON state.

Further, when the judgment result at the step S29 is YES, i.e., the Effect switch is in ON state, processing proceeds to step S30 to perform the above-described Effect period registration processing A, i.e., to proceed to step S31 to record Effect kind/parameter at that time point and start time into the Effect period Table to proceed to step S32.

Moreover, when the judgment result at the step S23 is NO, i.e., the Effect switch is in OFF state, the above-described Effect period registration processing B is performed, i.e., duration is determined from start time and end time of Effect at that time point to record the duration thus determined along with the Effect kind/parameter which has been already recorded in the Effect period Table to add the Effect period to proceed to step S32.

At the step S32, whether or not stop request is made is judged.

If the judgment result at the step S32 is NO, i.e., there is no stop request, processing returns to the step S25 to repeatedly perform processing of the step S32 from the step S25.

Further, if the judgment result at the step S32 is YES, i.e., stop request is made, processing proceeds to the subsequent step S33 to judge whether or not the Effect switch is in ON state.

In the case where the judgment result at the step S33 is NO, i.e., the Effect switch is not in ON state, processing proceeds to step S35 as it is.

Moreover, in the case where the judgment result at the step S33 is YES, i.e., the Effect switch is in ON state, processing proceeds to step S34 to perform the above-described Effect period registration processing B, i.e., to determine the Effect period from the start time and end time of Effect to record Effect kind and Effect period into the memory 8 to proceed to step S35.

At the step S35, management information having only original track, i.e., Movie Atom is read out from the memory 8. The Movie Atom thus read out is written onto the optical disk 20.

Further, at the subsequent step S36, the original track is caused to be source track to read out, from the memory 8, management information having Effect track, i.e., Movie Atom to write the Movie Atom thus read out onto the optical disk 20. In this instance, for time periods except for Effect period of Effect kind/parameter seemingly effective, Effect period of Null effect is prepared.

By the above-mentioned operation, there is completed processing of the main part in which arbitrary Effect period during which Effect is arbitrary is prepared by instruction from user at the time of record photographing. In the case where Effect is not implemented from the beginning to the end of photographing, Null Effect is implemented.

Moreover, there is executed, by the procedure shown in the flowchart of FIG. 21, the processing of the main part in the case where when there does not exist any one Effect period seemingly effective for a time period from the start of record photographing to the end thereof after record photographing, Movie Atom including Effect track is not prepared.

Namely, at step S41, user input by the user input part is performed.

At the subsequent step S42, whether or not picture recording start request is made is judged.

In the case where the judgment result at the step S42 is NO, i.e., there is no picture recording start request, processing returns to the step S41 to repeat processing of the steps S41 and S42 to stand by until picture recording start request is made from user.

Further, when the judgment result at the step S42 is YES, i.e., picture recording start request is made, processing proceeds to the subsequent step S43.

At the step S43, whether or not the Effect switch is in ON state is judged.

When the judgment result at the step S43 is NO, i.e., the Effect switch is in OFF state, processing proceeds to step S45 as it is.

Moreover, when the judgment result at the step S43 is YES, i.e., the Effect switch is in ON state, processing proceeds to step S44 to perform the above-described Effect period registration processing A, i.e., to record Effect kind/parameter at that time point and start time into the Effect period Table to proceed to step S45.

At the step S45, video/audio data is recorded, as Movie Data Atom, onto the optical disk 20 serving as storage.

At the subsequent step S46, management information of image and/or sound is recorded into the mounted memory 8 as Movie Atom.

At the subsequent step S47, user input by the user input part is performed.

At the subsequent step S48, whether or not the Effect button 44 is pushed down as user input at the step S47 so that the state of the Effect switch is changed is judged.

When the judgment result at the step S48 is NO, i.e., the state of the Effect switch is not changed, processing proceeds to step S52 as it is.

Further, in the case where the judgment result at the step S48 is YES, i.e., the state of the Effect switch is changed, processing proceeds to step S49 to judge whether or not the Effect switch is in ON state.

Further, when the judgment result at the step S49 is YES, i.e., the Effect switch is in ON state, processing proceeds to step S50 to perform the above-described Effect period registration processing A, i.e., to record Effect kind/parameter at that time point and start time into the Effect period Table to proceed to S52.

Moreover, when the judgment result at the step S43 is NO, i.e., the Effect switch is in OFF state, processing proceeds to step S51 to perform the above-described Effect period registration processing B, i.e., to determine duration from start time and end time of Effect at that time point to record the duration thus determined along with Effect kind/parameter already recorded in the Effect period Table to add the Effect period to proceed to step S52.

At the step S52, whether or not stop request is made is judged.

If the judgment result at the step S52 is NO, i.e., there is no stop request, processing returns to the step S45 to repeatedly perform processing of the step S52 from the step S45.

Further, if the judgment result at the step S52 is YES, i.e., there is stop request, processing proceeds to the subsequent step S53 to judge whether or not the Effect switch is in ON state.

In the case where the judgment result at the step S53 is NO, i.e., the Effect switch is not in ON state, processing proceeds to step S55 as it is.

Moreover, in the case where the judgment result at the step S53 is YES, i.e., the Effect switch is in ON state, processing proceeds to step S54 to perform the above-described Effect period registration processing B, i.e., to determine Effect period from start time and end time of Effect to record Effect kind and Effect period into the memory 8 to proceed to step S55.

At the step S55, management information having only original track, i.e., Movie Atom is read out from the memory 8. The Movie Atom thus read out is written onto the optical disk 20.

At the subsequent step S56, whether or not the Effect period exists in the memory 8 is judged.

In the case where the judgment result at the step S56 is NO, i.e., the Effect period does not exist in the memory 8, processing is completed as it is.

Moreover, in the case where the judgment result at the step S56 is NO, i.e., the Effect period exists in the memory 8, processing proceeds to step S57 to allow the original track to be source track to read out, from the memory 8, management information having Effect track, i.e., Movie Atom to write the Movie Atom thus read out onto the optical disk 20. In this instance, for time periods except for Effect period of Effect kind/parameter seemingly effective, Effect period of Null effect is prepared.

Namely, if after stop request is made so that record photographing is stopped, information of Effect period exists in the mounted memory 8, Movie Atom including Effect track is written onto the optical disk 20. If such information does not exist, any action is performed. Namely, Movie Atom including Effect track is not prepared on the optical disk 20. Namely, the processing in this case are the same in the case of the processing shown in the flowchart of FIG. 20 except for the judgment processing of the step S56.

Here, a practical example of processing shown in the flowchart of FIG. 20 is shown in FIGS. 22A to 22E.

Figure 22A:
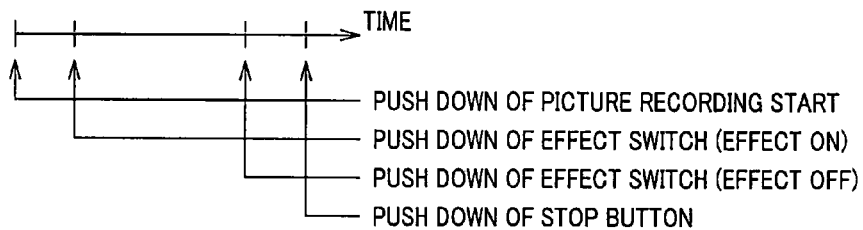
Figure 22C:
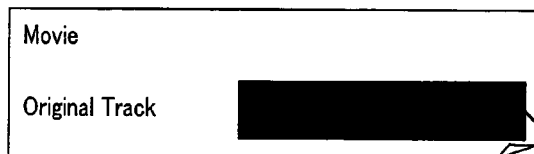
Figure 22D:
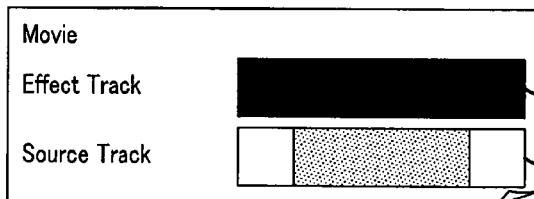
Figure 22E:
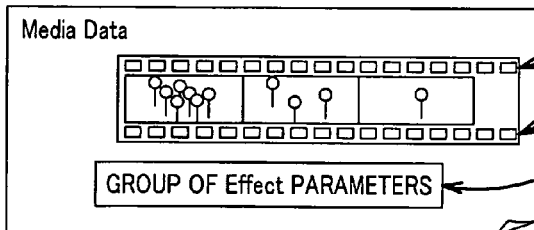

In the case where record photographing is started to push down the Effect button after one minute to push down the Effect button after four minutes to stop record photographing after five minutes as shown in FIG. 22A, Effect period Table as shown in FIG. 22B is prepared in the memory 8 during record photographing so that media data as shown in FIG. 22E are recorded onto the disk. After record photographing, Movie Atom having only original track and Movie Atom having source track and Effect track are prepared on the optical disk 20 as shown in FIGS. 22C and 22D. The video track or the Effect track within respective Movie Atoms allow media data to undergo external reference.

In this example, in FIGS. 22C and 22D, the portion indicated by black indicates video data, the portion indicated by dot indicates Effect_1, and white portion indicates Null Effect.

Then, an example of processing of Effect editing at the time of reproduction in which Effect period where Effect is arbitrary is prepared by instruction from user at the time of reproduction is shown in FIG. 23. The main part which performs this processing executes reproduction processing in accordance with the procedure shown in the flowchart of FIG. 23.

Namely, at step S61, user input by the user input part is performed.

At the subsequent step S62, whether or not reproduction start request is made is judged.

In the case where the judgment result at the step S62 is NO, i.e., there is no reproduction start request, processing returns to the step S61 to repeat processing of the steps S61 and S62 to stand by until reproduction start request is made from user.

When the judgment result at the step S62 is YES, i.e., reproduction start request is made, processing proceeds to the subsequent step S63.

At the step S63, whether or not Movie atom having Effect track exists is judged.

In the case where the judgment result at the step S63 is YES, i.e., Movie Atom having Effct track exists, processing proceeds to step S64 to read out, from the optical disk 20, an arbitrary Movie Atom to write the Movie Atom thus read out into the memory 8, and to construct Effect period Table on the basis of the Effect track to proceed to step S66.

Moreover, in the case where the judgment result at the step S63 is NO, i.e., Movie Atom having Effect track does not exist, processing proceeds to step S65 to read out, from the optical disk 20, Movie Atom having only video track to write the Movie Atom thus read out into the memory 8 to proceed to the step S66.

At the step S66, whether or not the Effect switch is in ON state is judged.

When the judgment result at the step S66 is NO, i.e., the Effect switch is in OFF state, processing proceeds to step S68 as it is.

Moreover, when the judgment result at the step S66 is YES, i.e., the Effect switch is in ON state, processing proceeds to step S67 to perform the above-described Effect period registration processing A, i.e., to record Effect kind/parameter at that time point and start time into the Effect period Table to proceed to step S68.

At the step S68, video/audio data, i.e., Movie Data Atom is read from the optical disk 20 serving as storage into the memory 8 to decode the Movie Data Atom thus read in to output image and/or sound to device.

At the subsequent step S69, user input by the user input part is performed.

At the subsequent step S70, whether or not the Effect button 44 is pushed down as user input at the step S47 so that the state of the Effect switch is changed is judged.

When the judgment result at the step S70 is NO, i.e., the state of the Effect switch is not changed, processing proceeds to step S74 as it is.

Moreover, in the case where the judgment result at the step S70 is YES, i.e., the state of the Effect switch is changed, processing proceeds to step S71 to judge whether or not the Effect switch is in ON state.

Further, when the judgment result at the step S71 is YES, i.e., the Effect switch is in ON state, processing proceeds to step S72 to perform the above-described Effect period registration processing A, i.e., to record Effect kind/parameter at that time point and start time into the Effect period Table to proceed to step S74.

Moreover, when the judgment result at the step S71 is NO, i.e., the Effect switch is in OFF state, processing proceeds to step S73 to perform the above-described Effect period registration processing B, i.e., to determine duration from start time and end time of Effect at that time point to record the duration thus determined into the Effect period Table along with Effect kind/parameter already recorded to add the Effect period to proceed to step S74.

At the step S74, whether or not video/audio data to be reproduced from the optical disk 20 is lost, and/or whether or not stop request is made is judged.

If the judgment result at the step S74 is NO, i.e., video/audio data to be reproduced from the optical disk 20 exists and stop request does not exist, processing returns to the step S68 to repeatedly perform processing of the step S74 from the step S68.

Further, if the judgment result at the step S74 is YES, i.e., video/audio data to be reproduced from the optical disk 20 is lost or stop request is made, processing proceeds to the subsequent step S75 to judge whether or not the Effect switch is in ON state.

In the case where the judgment result is NO at the step S75, i.e., the Effect switch is not in ON state, processing proceeds to step S77.

Moreover, in the case where the judgment result at the step S75 is YES, i.e., the Effect switch is in ON state, processing proceeds to step S76 to perform the above-described Effect period registration processing B, i.e., to determine Effect period from start time and end time of Effect to record Effect kind and Effect period into the memory 8 to proceed to step S77.

At the step S77, whether or not the entirety of Movie is Null effect is judged.

If the judgment result at the step S77 is NO, i.e., there exists Effect such that one entry or more exist in the Effect period Table over the entirety of Movie, Movie Atom having Effect track is read out from the memory 8. The Movie Atom thus read out is written onto the optical disk 20 to complete reproduction processing.

Moreover, in the case where the judgment result at the step S77 is YES, i.e., the entirety of Movie is Null Effect, reproduction processing is completed as it is.

By an operation as stated above, Movie Atom having Effect track is newly prepared, and Movie Atom having Effect track originally existing can be left as it is.

Here, at step S78, in writing Movie Atom having Effect track onto the optical disk 20, there are instances where Effect period entries overlap with each other in terms of time in the Effect period Table. At this time, it is possible to cope with such inconvenience by a method of overwriting Effect periods by using only one Effect track, or a method of newly adding Effect track to prepare Effect period therein so that multiple Effect is provided.

Here, practical examples of reproduction processing shown in the flowchart of FIG. 23 are shown in FIGS. 24A to 24D, FIGS. 25A and 25B, FIGS. 26A to 26D, and FIGS. 27A and 27B.

In the practical example of the multiple Effect in the case where reproduction of Movie shown in the above-mentioned FIG. 22 is started to push down the Effect button after two minutes to push down the Effect button after three minutes to stop reproduction after five minutes, Effect period Table as shown in FIG. 24B is read out from the optical disk 20 immediately after reproduction start. The Effect period Table thus read out is written into the memory 8. As a result, Effect period as shown in FIG. 24C is added during reproduction. Arrangement of the Table is performed. As shown in FIG. 24D, Effect period Table is newly prepared. Effect period is newly added thereinto. Effect kind/parameter of the Effect period which has been newly added is recorded onto the disk as media data.

After reproduction is stopped, Movie Atom having the structure of multiple Effect as shown in FIG. 25A is prepared on the optical disk 20. Video track or Effect track within Movie Atom allows Media Data as shown in FIG. 25B to undergo external reference as indicated by arrow.

In FIG. 25A, black indicates video data, the portion indicated by dot indicates Effect_1 portion indicated by slanting lines indicates Effect_2, and white portion indicates Null Effect.

Moreover, as shown in FIG. 26A, in the practical example for overwriting Effect period in the case where reproduction of Movie shown in the above-mentioned FIG. 22 is started to push down the Effect button after two minutes to push down the Effect button after three minutes to stop reproduction after five minutes, Effect period Table as shown in FIG. 26B is read out from the optical disk 20 immediately after reproduction is started. The Effect period table thus read out is written into the memory 8. Thus, Effect period as shown in FIG. 26C is added during reproduction. Arrangement of the Table is performed. Thus, Effect period table is reconstructed as shown in FIG. 26D. In this case, the Effect period originally existing is divided. Effect kind/parameter of Effect period to be newly added is recorded onto the optical disk 20 as media data.

Further, after reproduction is stopped, Movie Atom having track as shown in FIG. 27A is prepared on the optical disk 20. Video track or Effect track within Movie Atom allows media data to undergo external reference as indicated by arrow in FIG. 27B.

In this example, in FIG. 27A, black indicates video data, the portion indicated by dot indicates Effect_1, the portion indicated by slanting lines indicates Effect_2 and white portion indicates Null Effect.

Then, there is shown in FIG. 28 an example of processing in which, in place of directly preparing Movie Atom having Effect track at the time of record photographing, mark is attached to the time axis by instruction from user such as an operation to push down button, etc. at the time of record photographing to set arbitrary Effect kind/parameter at time period between arbitrary marks after record photographing has been completed so that Movie Atom having Effect track in accordance with such setting is prepared. The main part serving to perform this processing executes reproduction processing in accordance with the procedure shown in the flowchart of FIG. 28.

Namely, at step S81, user input by the user input part is performed.

At the subsequent step S82, whether or not picture recording start request is made is judged.

In the case where the judgment result at the step S82 is NO, i.e., there is no picture recording start request, processing returns to the step S81 to repeat processing of the steps S81 and S82 to stand by until picture recording start request is made from user.

Further, when the judgment result at the step S82 is YES, i.e., picture recording start request is made, processing proceeds to the subsequent step S83.

At the step S83, the mark Table in the memory 8 is emptied.

At the subsequent step S84, time is recorded into the mark Table.

As the subsequent step S85, video/audio data is recorded, as Movie Data Atom, onto the optical disk 20 serving as storage. Moreover, video/audio data is recorded, as Movie Data Atom, onto the disk serving as storage.

At the subsequent step S86, management information of image and sound is recorded into the mounted memory 8 as Movie Atom.

At the subsequent step S87, user input by the user input part is performed.

At the subsequent step S88, whether or not mark request by push-down of the mark button 46 is made as user input at the step S87 is judged.

In the case where the judgment result at the step S88 is NO, i.e., there is no mark request, processing proceeds to step S90 as it is.

Moreover, in the case where the judgment result at the step S88 is YES, i.e., mark request is made from user, processing proceeds to step S89 to add, as entry, time from picture recording start into the mark Table to proceed to step S90.

At the step S90, whether or not stop request by push-down of the stop button 43 is made is judged.

In the case where the judgment result at the step S90 is NO, i.e., video/audio data to be reproduced remains or there is no stop request, processing returns to the step S85 to repeatedly perform processing of the step S90 from the step S85.

Further, in the case where judgment result at the step S90 is YES, i.e., stop request is made from user, processing proceeds to the step S91 to add, as entry, time from picture recording start into the mark Table.

At the subsequent step S92, management information having only original video track, i.e., Movie Atom is written from the memory onto the optical disk 20 serving as storage to proceed to step S93.

At the step S93, the processing for preparing Effect period is performed.

At the subsequent step S94, whether or not the entirety of Movie is Null is judged.

If the judgment result at the step S94 is NO, i.e., one Effect period or more seemingly effective exist within the Effect period Table recorded in the memory 8, processing proceeds to step S95 to allow the original track to be source track to read out, from the memory 8, Movie Atom having Effect track to write the Movie Atom thus read out onto the optical disk 20 to compete recording processing.

Moreover, in the case where the judgment result at the step S94 is YES, i.e., the entirety of Movie is Null Effect, recording processing is completed as it is.

Here, at the step S93, practical examples of the processing for preparing Effect period are shown in FIGS. 29A to 29D, and FIGS. 30A to 30C.

Figure 29A:
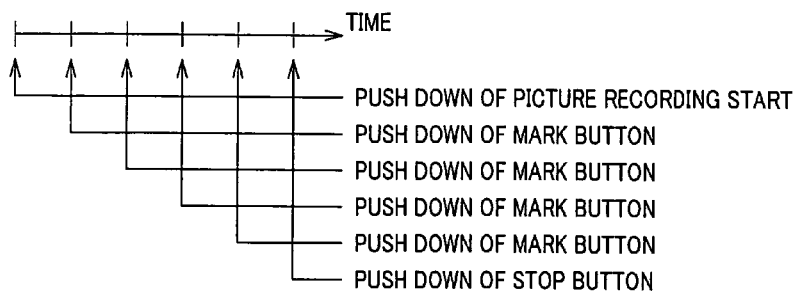
Figure 29B:
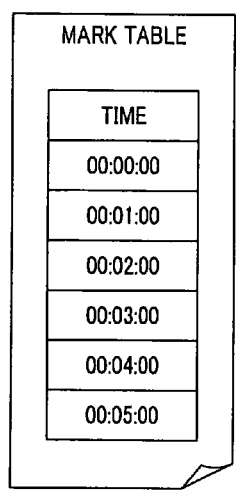
Figure 29C:
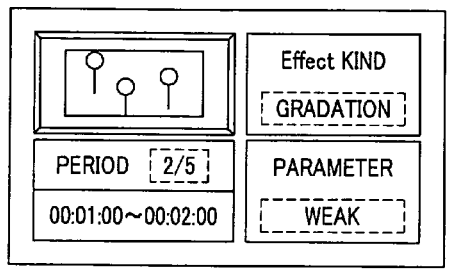

In the case where record photographing is started as shown in FIG. 29A to push down the mark button 46 after one minute, two minutes, three minutes and four minutes to stop record photographing after five minutes, mark Table as shown in FIG. 29B is prepared in the memory 8. Further, after record photographing operation is stopped, user sets kind/parameter of Effect every time period (between a mark and a mark positioned succeedingly by one) on a picture as shown in FIG. 29C. When setting is completed, Effect period as shown in FIG. 29D is prepared. Thus, kind/parameter of Effect is recorded onto the optical disk 20 as media data.

As shown in FIGS. 30A, 30B, Movie Atom having only original track and Movie Atom having source track and Effect track are prepared on the optical disk 20. Video tracks or Effect tracks within respective Movie Atoms allow media data to undergo external reference as indicated by arrow in FIG. 30C.

Here, black indicates video data, the portion indicated by dot indicates Effect_1, the portion indicated by slanting lines indicates Effect_2, and white portion indicates Null Effect.

It is to be noted that while the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

The invention claimed is:

1. A file recording/reproducing apparatus adapted for performing recording/reproduction of video data, through a recording medium, as a file in which management information for performing management of real data are collected by hierarchical structure, the file including block of management information at least including video tracks by management information of video data and Effect tracks by management information of Effects to be set at the video data, and block of real data at least including real data according to the Effect tracks, the file recording/reproducing comprising:

a recording/reproducing unit for recording/reproducing, through the recording medium, data of boxes of the real data and the management information;

a data processing unit for sequentially setting management unit at the real data to sequentially acquire the management information in correspondence with recording/reproduction of the real data to hold the management information thus acquired in a memory to output, to the recording/reproducing unit, data of the box of the management information by the management information held in the memory by responding to completion of recording of the real data; and a control unit for accepting an input by user to prepare plural management information different in reproduction purpose such as original Movie and Movie to which Effect has been implemented to the Movie, etc. at the time of recording video data in performing edit function of preparation and deletion of Effect track, and preparation, processing and deletion of Effect track period within the Effect track.

2. The file recording/reproducing apparatus as set forth in claim 1, wherein the control unit serves to automatically prepare block of management information having Effect tracks in accordance with instruction input to designate an arbitrary period in which Effect is desired to be implemented during recording of video data.

3. The file recording/reproducing apparatus as set forth in claim 2, wherein the control unit is operative so that when any instruction input is not given from starting of recording to end thereof, it does not prepare block of management information having Effect track, or it prepares block of management information having Effect track using Null effect in which no Effect appears.

4. The file recording/reproducing apparatus as set forth in claim 1, wherein the control unit serves to automatically prepare Effect period of a desired Effect kind/parameter within the Effect track in accordance with instruction input to designate an arbitrary period in which Effect is desired to be implemented during recording or reproduction of video data.

5. The file recording/reproducing apparatus as set forth in claim 4, wherein Effect release is further included in the Effect kind/parameter that the control unit prepares so that deletion of Effect period is resultantly provided.

6. The file recording/reproducing apparatus as set forth in claim 1, wherein the control unit is operative so that in the case where Effect tracks are all in Null Effect state where no Effect appears after recording or reproduction of video data is completed, it serves to delete block itself of management information having Effect tracks.

7. The file recording/reproducing apparatus as set forth in claim 1, wherein the control unit is operative so that in the case where Effect period is prepared, when any different Effect period already exists at a portion or the entirety of the Effect period, previous Effect is overwritten by current Effect at the Effect period.

8. The file recording/reproducing apparatus as set forth in claim 1, wherein the control unit is operative so that in the case where Effect period is prepared, when any different Effect period already exists at a portion or the entirety of the Effect period, new Effect track is added at the Effect period to prepare Effect period therein so that multiple Effect is provided.

9. The file recording/reproducing apparatus as set forth in claim 1, wherein the control unit serves to attach plural marks onto the time axis by instruction input from user at the time of recording video data to set an arbitrary Effect kind/parameter at a period between arbitrary marks after record photographing operation is completed to prepare block of management information having Effect track in accordance with that setting.

10. An editing method for video Effect at a file recording/reproducing apparatus adapted for performing recording/reproduction of video data, through a recording medium, as a file in which management information for performing management of real data are collected by hierarchical structure, the file including block of management information at least including video tracks by management information of video data and Effect tracks by management information of Effects to be set at the video data, and block of real data at least including real data according to the Effect tracks, the editing method for video effect comprising:

accepting an input by user to prepare plural management information different in reproduction purpose such as original Movie and Movie in which Effect has been implemented to the Movie at the time of recording video data in performing edit function of preparation and deletion of Effect track, and preparation, processing and deletion of Effect track period within the Effect track.

11. The editing method for video Effect as set forth in claim 10, wherein block of management information having Effect tracks is automatically prepared in accordance with instruction input to designate an arbitrary period in which Effect is desired to be implemented during recording of video data.

12. The editing method for video Effect as set forth in claim 11, wherein when any instruction input is not given from the start of recording to the end thereof, block of management information having Effect track is not prepared, or block of management information having Effect track using Null Effect in which no Effect appears is prepared.

13. The editing method for video Effect as set forth in claim 10, wherein Effect period of a desired Effect kind/parameter is automatically prepared within the Effect track in accordance with an instruction input to designate an arbitrary period to which Effect is desired to be implemented during recording or reproduction of video data.

14. The editing method for video Effect as set forth in claim 13, wherein Effect release is also included in the Effect kind/parameter so that deletion of Effect period is resultantly provided.

15. The editing method for video Effect as set forth in claim 10, wherein in the case where Effect tracks are all in Null Effect state where no Effect appears after recording or reproduction of video data is completed, block itself of management information having Effect track is deleted.

16. The editing method for video Effect as set forth in claim 10, wherein in the case where when Effect period is prepared, any different Effect period already exists within a portion or the entirety of Effect period, previous Effect is overwritten by current Effect at the Effect period.

17. The editing method for video Effect as set forth in claim 10, wherein in the case where when Effect period is prepared, any different Effect period already exists within a portion or the entirety of Effect period, new Effect track is added at the Effect period to prepare Effect period thereat so that multiple Effect is provided.

18. The editing method for video Effect as set forth in claim 10, wherein plural marks are attached on the time axis by instruction input from user at the time of recording video data to set an arbitrary Effect kind/parameter at a period between arbitrary marks after record photographing is completed to prepare block of management information having Effect track in accordance with that setting.

* * * * *